United States Patent
Ikui et al.

(10) Patent No.: US 11,581,752 B2
(45) Date of Patent: Feb. 14, 2023

(54) BATTERY CHARGING SYSTEM, CHARGING DEVICE, INFORMATION PROCESSING DEVICE, BATTERY CHARGING METHOD, PROGRAM, AND STORAGE MEDIUM

(71) Applicant: HONDA MOTOR CO., LTD., Tokyo (JP)

(72) Inventors: Kuniaki Ikui, Wako (JP); Tatsuo Hayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 17/297,005

(22) PCT Filed: Nov. 29, 2019

(86) PCT No.: PCT/JP2019/046831
§ 371 (c)(1),
(2) Date: May 26, 2021

(87) PCT Pub. No.: WO2020/111245
PCT Pub. Date: Jun. 4, 2020

(65) Prior Publication Data
US 2022/0045546 A1  Feb. 10, 2022

(30) Foreign Application Priority Data

Nov. 29, 2018 (JP) .............................. JP2018-223835

(51) Int. Cl.
*H02J 7/00* (2006.01)
*H02J 7/34* (2006.01)
(Continued)

(52) U.S. Cl.
CPC ............... *H02J 7/34* (2013.01); *H01M 10/46* (2013.01); *H01M 10/48* (2013.01);
(Continued)

(58) Field of Classification Search
CPC ......................................................... H02J 7/34
(Continued)

(56) References Cited

U.S. PATENT DOCUMENTS

2008/0281732 A1* 11/2008 Yamada .............. H01M 10/425
705/308
2014/0028089 A1* 1/2014 Luke .................. G06Q 30/0261
320/128
(Continued)

FOREIGN PATENT DOCUMENTS

| EP | 2592428 | 5/2013 |
| EP | 2182575 | 3/2017 |

(Continued)

OTHER PUBLICATIONS

Japanese Office Action for Japanese Patent Application No. 2020-557861 dated Sep. 21, 2021.
(Continued)

*Primary Examiner* — Yalkew Fantu
(74) *Attorney, Agent, or Firm* — Amin, Turocy & Watson, LLP

(57) ABSTRACT

A battery charging system includes a battery removably mounted on an electric power device using electric power, a charging device configured to charge the battery using renewable power which is electric power generated from renewable energy, and a server configured to communicate with the charging device. The charging device is configured to control charging of the battery accommodated in an accommodation unit on the basis of reception information received from the server. The server is configured to compare receivable power, which is the renewable power capable of being received by the charging device, with a threshold value and configured to transmit transmission information for causing the charging device to control the charging of the battery to the charging device on the basis of a result of comparing the receivable power with the threshold value.

14 Claims, 15 Drawing Sheets

(51) Int. Cl.
 *H01M 50/247* (2021.01)
 *H01M 10/46* (2006.01)
 *H01M 10/48* (2006.01)
 *G06Q 50/06* (2012.01)

(52) U.S. Cl.
 CPC ......... *H01M 50/247* (2021.01); *H02J 7/0013* (2013.01); *H02J 7/00032* (2020.01); *H02J 7/00712* (2020.01); *G06Q 50/06* (2013.01); *H01M 2220/30* (2013.01)

(58) Field of Classification Search
 USPC .......................................................... 320/106
 See application file for complete search history.

(56) References Cited

U.S. PATENT DOCUMENTS

2014/0320080 A1* 10/2014 Nyu ..................... B60L 53/305
 320/109

2015/0039391 A1* 2/2015 Hershkovitz ........... B60L 53/65
 705/7.31

FOREIGN PATENT DOCUMENTS

| | | |
|---|---|---|
| JP | 2001-057711 | 2/2001 |
| JP | 2009-296820 | 12/2009 |
| JP | 2011-096233 | 5/2011 |
| JP | 2014-023204 | 2/2014 |
| JP | 2014-233180 | 12/2014 |
| JP | 2019-068552 | 4/2019 |
| WO | 2013/024645 | 2/2013 |

OTHER PUBLICATIONS

International Search Report and Written Opinion for International Application No. PCT/JP2019/046831 dated Feb. 18, 2020, 8 pages.
Extended European Search Report for European Patent Application No. 19891429.3 dated Dec. 10, 2021.

* cited by examiner

FIG. 7

| THRESHOLD VALUE | NUMBER OF SLOT WHERE CHARGING IS POSSIBLE |
|---|---|
| FIRST THRESHOLD VALUE | 1 |
| SECOND THRESHOLD VALUE | 4 |
| THIRD THRESHOLD VALUE | 6 |
| FOURTH THRESHOLD VALUE | 8 |

FIG. 10

| | SLOT ID=1 | BATTERY ID=2018000001 |
|---|---|---|
| | SLOT ID=2 | BATTERY ID=2007123456 |
| | SLOT ID=3 | BATTERY ID=20184626462 |
| SLOT ID AND BATTERY ID | SLOT ID=4 | BATTERY ID=2017234567 |
| | SLOT ID=5 | BATTERY ID=20183333333 |
| | SLOT ID=6 | BATTERY ID=20177685761 |
| | SLOT ID=7 | BATTERY ID=20180304050 |
| | SLOT ID=8 | BATTERY ID=2017182456 |
| BATTERY REPLACEMENT DEVICE ID | BATTERY REPLACEMENT DEVICE ID=002345 | |

BATTERY CHARGING SYSTEM, CHARGING DEVICE, INFORMATION PROCESSING DEVICE, BATTERY CHARGING METHOD, PROGRAM, AND STORAGE MEDIUM

TECHNICAL FIELD

The present invention relates to a battery charging system, a charging device, an information processing device, a battery charging method, a program, and a storage medium.

Priority is claimed on Japanese Patent Application No. 2018-223835, filed Nov. 29, 2018, the content of which is incorporated herein by reference.

BACKGROUND ART

In recent years, electric vehicles such as electric vehicles (EVs) and hybrid electric vehicles (HEVs), which travel using electric motors driven with electric power supplied from batteries, have been developed. In the electric vehicles, when a battery, which is a drive source, has run out of power, it is necessary to charge the battery to continue subsequent traveling.

Incidentally, some recent electric vehicles adopt batteries configured to be removable (hereinafter referred to as "removable batteries"). When a currently mounted removable battery has run out of power in an electric vehicle adopting a removable battery, it is possible to continue traveling by performing replacement with another removable battery storing sufficient electric power such as a spare removable battery whose charging is completed. The development of a so-called battery sharing service in which a removable battery is shared by a plurality of users using electric vehicles has been studied.

In the above-described battery sharing service, the user replaces the removable battery at charging stations installed at a plurality of locations. At the charging station, a returned removable battery is charged and stored and the charged removable battery is rented out when another user comes to replace a removable battery (see, for example, Patent Document 1).

As another example of a movable object from which a battery can be removed, a portable power charging/supplying device including a battery and a power charging/supplying unit in which an accommodation chamber for accommodating the battery is formed is known (see, for example, Patent Document 2).

CITATION LIST

Patent Document

[Patent Document 1]
Japanese Unexamined Patent Application, First Publication No. 2001-57711
[Patent Document 2]
Japanese Unexamined Patent Application, First Publication No. 2019-068552

SUMMARY OF INVENTION

Technical Problem

Here, it is general to connect system power capable of being stably used to a charging device that charges a battery as in a battery replacement device installed in a charging station. However, the charging device may be supplied with electric power generated from renewable energy (such as wind power or mega solar power). Because the available electric power changes from moment to moment when electric power generated from renewable energy is used, there is equipment that receives electric power in parallel with the charging station and therefore there is a possibility that power consumption of the charging station will be a cause of a failure such as a change in a voltage or a change in a frequency.

Aspects of the present invention have been made in view of the above problems and an objective of the present invention is to provide a battery charging system, a charging device, an information processing device, a battery charging method, a program, and a storage medium capable of controlling charging of a battery accurately as compared with the conventional technology even if a charging device charges the battery using renewable energy.

Solution to Problem

A battery charging system, a charging device, an information processing device, a battery charging method, a program, and a storage medium according to the present invention adopt the following configurations.

(1) According to an aspect of the present invention, there is provided a battery charging system including: a battery removably mounted on an electric power device using electric power; a charging device configured to charge the battery using renewable power which is electric power generated from renewable energy; and a server configured to communicate with the charging device, wherein the charging device includes a first communicator configured to communicate with the server; an accommodation unit configured to accommodate the battery; and a first controller configured to control charging of the battery accommodated in the accommodation unit on the basis of reception information received by the first communicator from the server, and wherein the server includes a second communicator configured to communicate with the charging device; and a second controller configured to compare receivable power, which is the renewable power capable of being received by the charging device, with a threshold value and transmit transmission information for causing the charging device to control the charging of the battery to the charging device via the second communicator on the basis of a result of comparing the receivable power with the threshold value.

(2) In the aspect (1), when the receivable power is less than the threshold value, the second controller is configured to transmit the transmission information for prohibiting the charging of the battery to the charging device via the second communicator.

(3) In the aspect (1) or (2), when the receivable power is greater than or equal to the threshold value, the second controller is configured to transmit the transmission information for permitting the charging of the battery to the charging device via the second communicator.

(4) In any one of the aspects (1) to (3), the battery includes a plurality of batteries, the accommodation unit includes a plurality of accommodation units, the threshold value includes a plurality of threshold values, the number of accommodation units is set in correspond to each of the plurality of threshold values, and the second controller is configured to compare the receivable power with each of the plurality of threshold values and transmit the transmission information according to each of a plurality of accommodation units to the charging device via the second communicator on the basis of a comparison result.

(5) In any one of the aspects (1) to (4), the battery includes a plurality of batteries, the accommodation unit includes a plurality of accommodation units, the charging device receives non-renewable power including at least one of electric power generated by thermal power generation, electric power generated by hydroelectric power generation, and electric power generated by nuclear power generation, when the receivable power is less than the threshold value, the second controller is configured to transmit the transmission information for causing the charging device to charge a predetermined number of batteries to be charged at a minimum among a plurality of batteries and to prohibit the charging of more than the predetermined number of the battery to the charging device via the second communicator; and the first controller is configured to cause the charging of the predetermined number of batteries among the plurality of batteries using the renewable power and prohibits the charging of more than the predetermined number of the battery on the basis of the reception information received by the first communicator from the server.

(6) In the aspect (5), the first controller is configured to cause the charging of more than the predetermined number of the battery using the non-renewable power.

(7) In the aspect (5) or (6), when there is a battery whose charging is not completed among a plurality of batteries and a predetermined time has been reached, the second controller is configured to transmit the transmission information for causing the charging device to start the charging of the battery to the charging device via the second communicator.

(8) In any one of the aspects (3) to (7), battery identification information, which is identification information for identifying the battery, is assigned to each of a plurality of batteries, accommodation unit identification information, which is identification information for identifying the accommodation unit, is assigned to each of a plurality of accommodation units, the charging device further includes an acquirer configured to acquire the battery identification information from the battery accommodated in the accommodation unit, the first controller is configured to transmit corresponding information, which is information in which the accommodation unit identification information of the accommodation unit where the battery corresponding to the battery identification information acquired by the acquirer is accommodated and the battery identification information acquired by the acquirer are associated with each other, to the server via the first communicator, the first controller is configured to control the charging of the battery for each accommodation unit on the basis of the reception information received by the first communicator from the server, the second controller is configured to generate first transmission information for prohibiting the charging of the battery or second transmission information for permitting the charging of the battery for each accommodation unit on the basis of the corresponding information received by the second communicator from the charging device, and the second controller is configured to transmit the first transmission information or the second transmission information generated for each accommodation unit to the charging device via the second communicator.

(9) In the aspect (8), when the battery has been newly accommodated in the accommodation unit where the battery was not accommodated, the acquirer acquires the battery identification information from a new battery which is the battery newly accommodated in the accommodation unit, and the first controller is configured to transmit the corresponding information in which the battery identification information of the new battery acquired by the acquirer and the accommodation unit identification information of the accommodation unit where the new battery has been accommodated are associated with each other to the server via the first communicator.

(10) According to another aspect of the present invention, there is provided a charging device for charging a battery removably mounted on an electric power device using electric power, the charging device including: an accommodation unit configured to accommodate the battery; and a controller configured to compare receivable power, which is able to be received by the charging device and is renewable power generated from renewable energy, with a threshold value and control the charging of the battery using the renewable power on the basis of a result of comparing the receivable power with the threshold value.

(11) According to yet another aspect of the present invention, there is provided an information processing device including: a communicator configured to communicate with a charging device including an accommodation unit where a battery removably mounted on an electric power device using electric power is accommodated and configured to charge the battery accommodated in the accommodation unit using renewable power which is electric power generated from renewable energy; and a controller configured to compare receivable power, which is the renewable power capable of being received by the charging device, with a threshold value and transmit transmission information for causing the charging device to control the charging of the battery to the charging device via the communicator on the basis of a result of comparing the receivable power with the threshold value.

(12) According to still another aspect of the present invention, there is provided a battery charging method including: a process in which a computer, which includes a communicator configured to communicate with a charging device including an accommodation unit where a battery removably mounted on an electric power device using electric power is accommodated and configured to charge the battery accommodated in the accommodation unit using renewable power which is electric power generated from renewable energy, compare receivable power, which is the renewable power capable of being received by the charging device, with a threshold value; and a process in which the computer is configured to transmit transmission information for causing the charging device to control the charging of the battery to the charging device via the communicator on the basis of a result of comparing the receivable power with the threshold value.

(13) According to still another aspect of the present invention, there is provided a program for causing a computer, which includes a communicator configured to communicate with a charging device including an accommodation unit where a battery removably mounted on an electric power device using electric power is accommodated and configured to charge the battery accommodated in the accommodation unit using renewable power which is electric power generated from renewable energy, to execute: a process of comparing receivable power, which is the renewable power capable of being received by the charging device, with a threshold value; and a process of transmitting transmission information for causing the charging device to control the charging of the battery to the charging device via the communicator on the basis of a result of comparing the receivable power with the threshold value.

(14) According to still another aspect of the present invention, there is provided a computer-readable storage medium storing the program according to the aspect (13).

Advantageous Effects of Invention

According to any one aspect described above, it is possible to control charging of a battery accurately as compared with the conventional technology even if a charging device charges the battery using renewable energy.

BRIEF DESCRIPTION OF DRAWINGS

FIG. 7 is a diagram showing an example of a plurality of threshold values stored in a server storage according to the first embodiment.

FIG. 10 is a diagram showing an example of a battery state list transmitted to an operation server by a battery replacement device according to the third embodiment.

DESCRIPTION OF EMBODIMENTS

Figure 1:
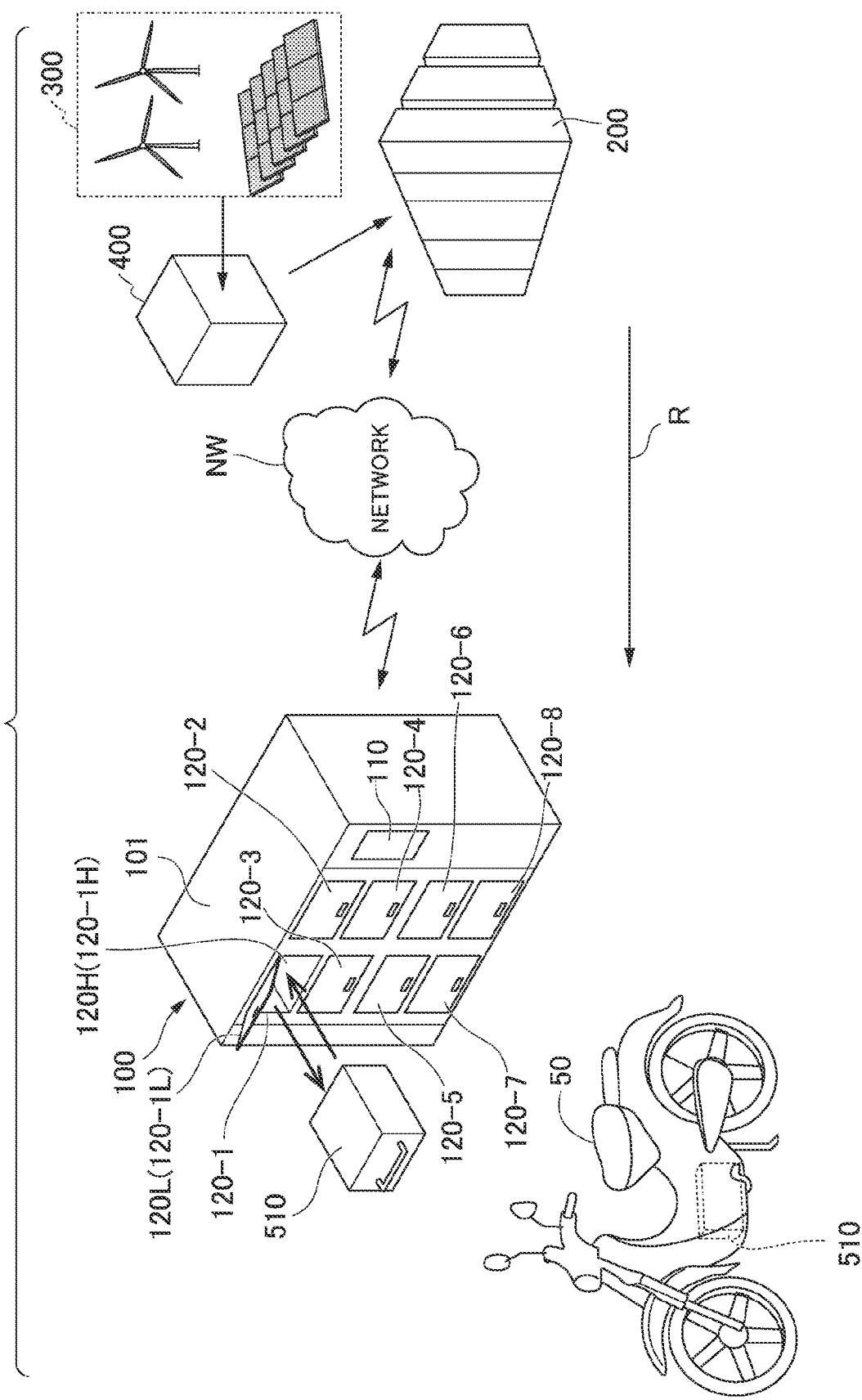
FIG. 1 is a diagram showing a concept of a battery sharing service adopting a shared battery management system according to a first embodiment.

Hereinafter, embodiments of the present invention will be described with reference to the drawings. In the drawings used in the following description, the scale of each member is appropriately changed to make each member recognizable. In the following description, a case in which a shared battery management system of the present embodiment manages the replacement of a plurality of removable batteries shared by a plurality of saddle riding-type electric vehicles (hereinafter referred to as "electric motorcycles"), which have adopted a battery configured to be removable (hereinafter referred to as a "removable battery") will be described.

First Embodiment

First, an example of an overall configuration of a shared battery management system according to a first embodiment will be described. FIG. 1 is a diagram showing a concept of a so-called battery sharing service adopting the shared battery management system according to the first embodiment. The shared battery management system is an example of a "battery charging system."

As shown in FIG. 1, the shared battery management system 10 is configured to include a removable battery 510, a battery replacement device 100, an operation server 200, a power generation system 300, and a management server 400. Although one operation server 200 can be configured to correspond to a plurality of battery replacement devices 100 in the shared battery management system 10, only one battery replacement device 100 is shown in FIG. 1. In FIG. 1, an electric motorcycle 50 (an electric vehicle), which is an example of a movable device that uses a battery sharing service adopting the shared battery management system 10, is shown. The removable battery 510 is an example of a "battery," the battery replacement device 100 is an example of a "charging device," and the operation server 200 is an example of a "server" or an "information processing device."

In the system shown in FIG. 1, electric power generated from renewable energy is supplied to the battery replacement device 100. Normal electric power (electric power generated by hydroelectric power generation, electric power generated by thermal power generation, electric power generated by nuclear power generation, or the like) may also be supplied to the battery replacement device 100.

The electric motorcycle 50 is an electric vehicle that travels using an electric motor driven with electric power supplied from a removable battery 510. The electric motorcycle 50 may be a hybrid electric vehicle that travels according to driving based on a combination of a removable battery 510 and an internal combustion engine such as a diesel engine or a gasoline engine. The electric motorcycle 50 is an example of an "electric power device."

The "electric power device" is not limited to the electric motorcycle 50 and may be, for example, a vehicle (a one-wheel vehicle, a three-wheel vehicle, a four-wheel vehicle, or the like) which can travel with electric power and on which a removable battery 510 can be removably mounted, or an assist-type bicycle. Instead of these vehicle-type movable objects, the "electric power device" may be a portable power charging/supplying device carried by a person or a vehicle described in Japanese Unexamined Patent Application, First Publication No. 2019-068552. Also, the "electric power device" may be a movable robot, an autonomous traveling device, an electric bicycle, an autonomous traveling vehicle, another electric vehicle, a drone flying object, or another electric movable device (electric mobility). Hereinafter, an example in which the "electric power device" is the electric motorcycle 50 will be described.

The removable battery 510 is, for example, a cassette-type power storage device (secondary battery) that is removably mounted on the electric motorcycle 50. At least one removable battery 510 is mounted on one electric motorcycle 50. In the following description, the electric motorcycle 50 will be described as an electric vehicle equipped with one removable battery 510.

The removable battery 510 is shared by a plurality of electric vehicles. Identification information (hereinafter referred to as a "battery ID" (battery identification information)) for identifying the removable battery 510 is exclusively assigned to the removable battery 510.

The battery ID may be a serial number (a manufacture's serial number) of the removable battery 510. The removable battery 510 is returned and stored in any one of slots 120-1 to 120-8 of the battery replacement device 100. In the following description, when one of the slots 120-1 to 120-8 is not specified, it is referred to as a slot 120.

In the following description, the removable battery 510 returned to the slot 120 by a user of the electric motorcycle 50 due to the consumption of electric power is referred to as a "used removable battery 510u." The removable battery 510 whose charging is completed by the battery replacement device 100 and which is taken out from the slot 120 by the user of the electric motorcycle 50 is referred to as a "charged removable battery 510c." In the present embodiment, the term "charged" means that the charging rate is not limited to 100% and the charging rate may be a predetermined value (for example, 80%) or more.

The battery replacement device 100 is installed within a charging/replacement station (not shown). For example, charging/replacement stations are installed at a plurality of locations. The battery replacement device 100 exchanges information with the operation server 200 through communication via the network NW and controls whether or not to perform charging of the removable battery 510.

The battery replacement device 100 receives an instruction R (a charging stop instruction or a charging stop release instruction) transmitted by the operation server 200. When the charging stop instruction transmitted by the operation server 200 has been received, the battery replacement device 100 performs control so that charging of the removable battery 510 is stopped based on the received charging stop instruction. The charging stop instruction received by the battery replacement device 100 from the operation server 200 is an example of "reception information."

When a charging stop release instruction transmitted by the operation server 200 has been received, the battery replacement device 100 performs control so that the charging stop of the removable battery 510 is released based on the received charging stop release instruction. The charging stop release instruction received by the battery replacement device 100 from the operation server 200 is another example of the "reception information".

The battery replacement device 100 selects the removable battery 510 to be rented out from charged removable batteries 510c and rents out the selected removable battery 510.

FIG. 1 shows an example of a configuration of the battery replacement device 100. The battery replacement device 100 shown in FIG. 1 includes a display 110 and eight slots 120-1 to 120-8 including a charging function in a housing 101. Each slot 120 includes an accommodation unit 120H and an opening/closing lid 120L. The accommodation unit 120H includes a structure in which an opening is provided on a front surface thereof and the removable battery 510 can be moved in and out of the accommodation unit 120H through the opening. A connector 120T (FIG. 3) for acquiring the battery ID of the removable battery 510 when a connection with the accommodated removable battery 510 is made is provided on a back side of the accommodation unit 120H. The opening/closing lid 120L is a lid for opening/closing the opening on the front surface of the accommodation unit 120H and includes a structure in which the removable battery 510 can be moved in and out of the accommodation unit 120H when the opening is in an open state and the removable battery 510 cannot be moved in and out of the accommodation unit 120H when the opening is in a closed state. According to the above-described structure, each slot 120 can restrict the insertion/detachment or the rental of the removable battery 510 accommodated in the accommodation unit 120H by locking the opening/closing lid 120L in the closed state. That is, the battery replacement device 100 locks the opening/closing lid 120L to prohibit the removable battery 510 from being taken out from the accommodation unit 120H or unlocks the opening/closing lid 120L to permit the removable battery 510 to be taken out from the accommodation unit 120H.

The power generation system 300 is a system that generates electric power using renewable energy. The power generation system 300 is, for example, at least one of wind power generation, solar power generation, geothermal power generation, biomass power generation, and the like.

The management server 400 is a server that manages the power generation system 300. The management server 400 calculates an amount of electric power capable of being supplied to the battery replacement device 100 based on the information acquired from the power generation system 300 and transmits information representing the calculated amount of electric power capable of being supplied (hereinafter referred to as suppliable power amount information) to the operation server. The amount of electric power capable of being supplied to the battery replacement device 100 is an amount of electric power obtained by time-integrating the electric power generated by the power generation system 300 using renewable energy (for example, the unit is [Wh]) or a value of electric power itself before time-integration (for example, the unit is [W]). The amount of electric power capable of being supplied to the battery replacement device 100 may be read as an amount of electric power capable of being received by the battery replacement device 100 (an example of "receivable power"). The management server 400 and the operation server 200 are connected so that they can communicate with each other. The electric power generated by the power generation system 300 using renewable energy is an example of "renewable power."

The operation server 200 is a server facility that manages charging of the removable battery 510 with which replacement is able to be performed in the battery replacement device 100 based on the suppliable power amount information received from the management server 400. The operation server 200 compares an amount of electric power represented by the suppliable power amount information received from the management server 400 with a threshold value stored in the operation server 200. When the amount of electric power capable of being supplied is greater than or equal to the threshold value, the operation server 200 transmits an instruction for releasing the charging stop (the charging stop release instruction) to the battery replacement device 100. When the amount of electric power capable of being supplied is less than the threshold value, the operation server 200 transmits an instruction for stopping charging (the charging stop instruction) to the battery replacement device 100. The charging stop instruction and the charging stop release instruction transmitted by the operation server 200 to the battery replacement device 100 are examples of "transmission information."

(Configuration of Removable Battery 510)

Figure 2:
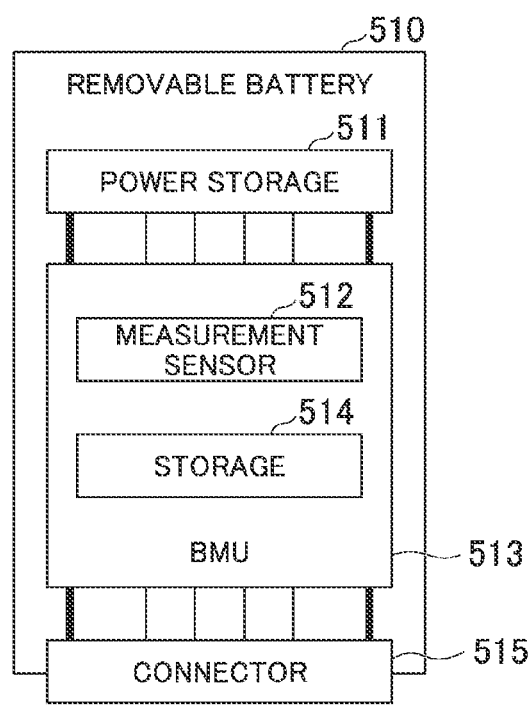
FIG. 2 is a block diagram showing an example of a configuration of a removable battery according to the first embodiment.

Next, an example of a configuration of the removable battery 510 will be described. FIG. 2 is a block diagram showing an example of the configuration of the removable battery 510 according to the present embodiment. As shown in FIG. 2, the removable battery 510 includes a power storage 511, a battery management unit (BMU) 513, and a connector 515. The BMU 513 includes a measurement sensor 512 and a storage 514.

The power storage 511 is configured to include a storage battery that stores electric power through charging and is discharged with the stored power. As the storage battery included in the power storage 511, for example, a secondary battery such as a lead storage battery or a lithium-ion battery, a capacitor such as an electric double layer capacitor, a composite battery in which a secondary battery and a capacitor are combined, or the like is used.

The measurement sensor 512 is configured to include various types of sensors for measuring the state of the power storage 511. The measurement sensor 512 measures a voltage stored in the power storage 511 using, for example, a voltage sensor. The measurement sensor 512 measures an electric current flowing through the power storage 511 using, for example, an electric current sensor. Also, the measurement sensor 512 measures the temperature at which the power storage 511 is charged or the power storage 511 is discharged using, for example, a temperature sensor. The measurement sensor 512 outputs a measured value representing a measured state of the power storage 511 to a processor on the BMU 513.

The BMU 513 is a battery management unit and controls charging and discharging of the power storage 511. The BMU 513 is configured to include a processor such as, for example, a central processing unit (CPU), and a memory such as, for example, a read only memory (ROM) or a random access memory (RAM), as the storage 514. In the BMU 513, the CPU implements a control function of the power storage 511 by reading and executing a program stored in the storage 514. The BMU 513 causes the storage 514 to store information such as content of the control performed on the power storage 511 based on the measured value representing the state of the power storage 511 output from the measurement sensor 512.

The storage 514 stores battery state information such as a battery ID assigned to the removable battery 510. In addition to the battery ID, the battery state information includes, for example, information such as the number of times of charging, a date of manufacture, a capacity in an initial state, and a charging rate. The storage 514 stores information such as an abnormality or a failure detected by the BMU 513 itself, an abnormality or a failure of the power storage 511 ascertained using the measurement sensor 512, and the like.

The connector 515 is a connector for supplying the electric power stored in the power storage 511 to the electric motor that is the drive source of the electric motorcycle 50 when the removable battery 510 has been mounted on the electric motorcycle 50. The connector 515 is connected to a structure that connects to the removable battery 510 provided on the back side of the accommodating portion 120H when the removable battery 510 has been accommodated in the slot 120 provided in the battery replacement device 100. The connector 515 is also a connector for transmitting information such as a battery ID, the number of times of charging, and a measured value representing the state of the power storage 511 exchanged between the removable battery 510 and the battery replacement device 100 and transmitting electric power.

(Configuration of Battery Replacement Device 100)

Figure 3:
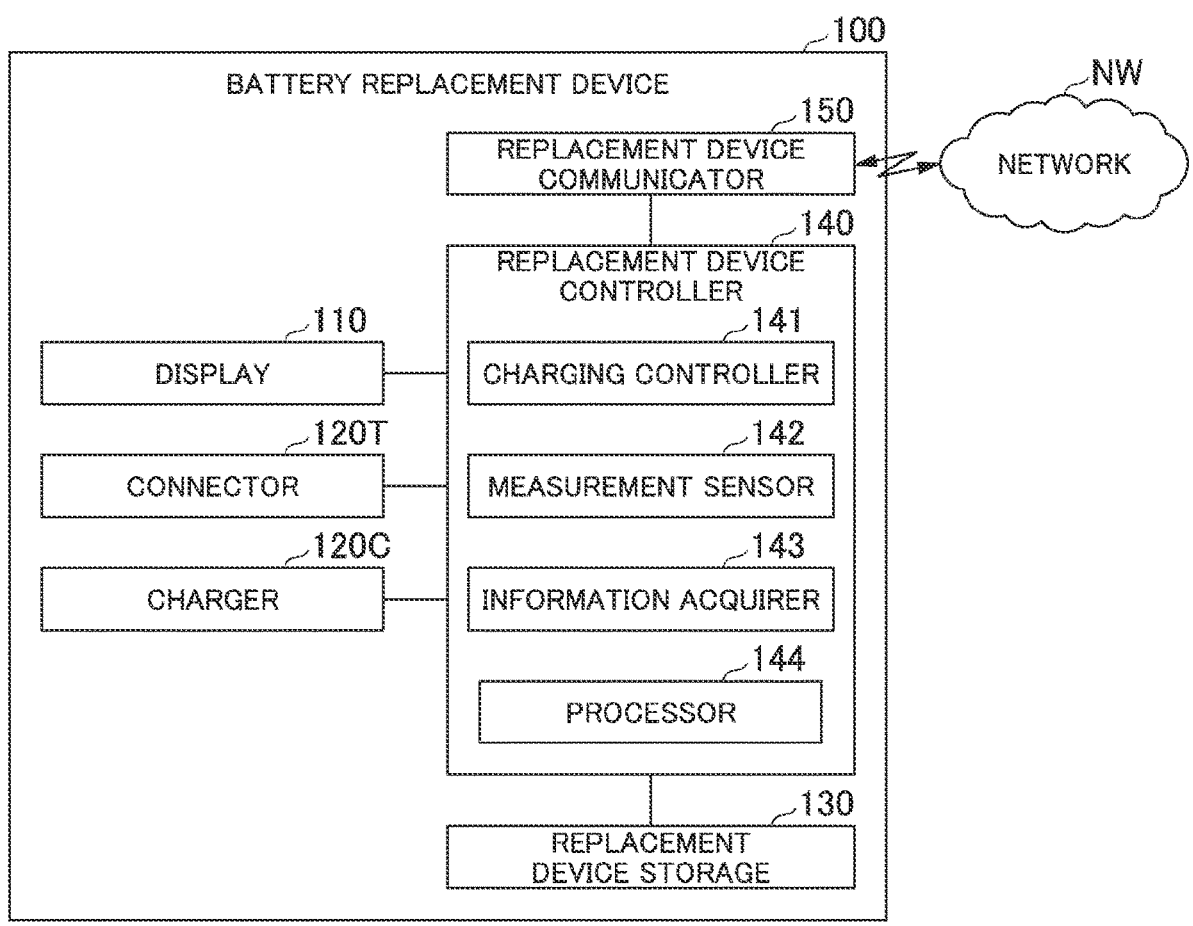
FIG. 3 is a block diagram showing a schematic configuration of a battery replacement device according to the first embodiment.

Subsequently, an example of a configuration of the battery replacement device 100 will be described. FIG. 3 is a block diagram showing a schematic configuration of the battery replacement device 100 according to the present embodiment. As shown in FIG. 3, the battery replacement device 100 includes a display 110, a connector 120T, a charger 120C, a replacement device storage 130, a replacement device controller 140, and a replacement device communicator 150. The replacement device controller 140 includes a charging controller 141, a measurement sensor 142, an information acquirer 143, and a processor 144. The replacement device controller 140 is an example of a "first controller" and the replacement device communicator 150 is an example of a "first communicator."

When the battery replacement device 100 includes eight slots 120 as shown in FIG. 1, slot IDs (slot identification information), which is identification information of the slots 120, are exclusively assigned to the slots 120-N (N is an integer of 1 to 8).

The display 110 is, for example, a liquid crystal display device, an organic electro luminescence (EL) display device, or the like. The display 110 displays image information output by the processor 144. The image information includes, for example, the number of the slot 120 in which the rentable removable battery 510 is accommodated, a usage fee, and the like. The display 110 includes an inputter based on a touch panel sensor or the like. The touch panel sensor detects a result of an operation performed by the user and outputs the operation result, which has been detected, to the processor 144. For example, the operation result includes a replacement instruction for the removable battery 510 or the like.

The connector 120T is a connector including a structure that electrically connects to the connector 515 included in the accommodated removable battery 510 in the slot 120. The connector 120T is provided, for example, on the back side of the accommodation unit 120H, for each slot 120. Each connector 120T transmits information such as a battery ID, the number of times of charging, a deterioration state, and a measured value representing a state of the power storage 511 exchanged between the removable battery 510 accommodated in the corresponding slot 120 and the replacement device controller 140. The connector 120T transmits electric power to the removable battery 510. That is, the connector 120T supplies the power storage 511 with electric power for charging. When there are eight slots 120 as shown in FIG. 1, the slots 120-N include a connector 120T-N.

The charger 120C is a charger for charging the removable battery 510 in accordance with control from the replacement device controller 140 when the removable battery 510 is accommodated in the slot 120 and the connector 515 of the accommodated removable battery 510 is connected to the connector 120T. The charger 120C charges the removable battery 510 by supplying electric power to the power storage 511 of the removable battery 510 via the connector 120T. In the battery replacement device 100, the charger 120C is provided for each slot 120. When there are eight slots 120 as shown in FIG. 1, the connector 120T-N includes a charger 120C-N.

The replacement device storage 130 stores various information in the battery replacement device 100. The replacement device storage 130 stores a program for the replacement device controller 140 to execute the function of the battery replacement device 100. The replacement device storage 130 stores information about whether or not the removable battery 510 has been accommodated in each slot 120 and a battery ID of the removable battery 510 accommodated in each slot 120. The replacement device storage 130 stores a slot ID of each slot 120. The replacement device storage 130 stores a corresponding relationship between the slot 120 and the slot ID. The replacement device storage 130 may store information such as the number of times the removable battery 510 has been charged, a deteriorated state, a charging rate, and a measured value representing a state of the power storage 511.

The replacement device controller 140 controls the entire battery replacement device 100. The replacement device controller 140 is configured to include, for example, a processor such as a CPU. The replacement device controller 140 implements the function of the battery replacement device 100 by reading and executing the program stored in the replacement device storage 130. More specifically, the replacement device 140 controls charging of the removable battery 510 accommodated in the slot 120 based on the instruction R received from the operation server 200. The replacement device controller 140 controls the rental of the removable batteries 510 respectively accommodated in the slots 120.

The measurement sensor 142 includes various sensors that measure the state when the charger 120C is charging the removable battery 510. The measurement sensor 142 is configured to include, for example, a voltage sensor, an electric current sensor, and a temperature sensor. The measurement sensor 142 measures a voltage applied to the power storage 511 when the removable battery 510 is being charged using the voltage sensor and measures an electric current flowing through the power storage 511 using the current sensor. The measurement sensor 142 measures the temperature of the power storage 511 when the removable battery 510 is being charged using the temperature sensor. The measurement sensor 142 outputs a measured value representing a measured state of the removable battery 510 to the charging controller 141.

The information acquirer 143 acquires the battery state information of the removable battery 510 accommodated in the slot 120, i.e., the removable battery 510 stored in the battery replacement device 100, via the connector 120T. The battery state information includes at least the battery ID. The battery state information may include information such as the number of times of charging and a measured value representing the state of the power storage 511. The information acquirer 143 outputs the acquired battery state information to the processor 144. The information acquirer 143 may cause the replacement device storage 130 to store the acquired battery state information.

The processor 144 carries out a procedure process of replacing the removable battery 510 in the battery replacement device 100.

The charging controller 141 controls a state of charge of the removable battery 510. When the charging stop instruction has been acquired via the replacement device communicator 150, the charging controller 141 performs control so that charging is stopped or so that the charging is not performed. The charging stop instruction is an instruction for stopping charging of the removable battery 510 or an instruction for preventing charging of the removable battery 510 from being performed. The charging controller 141 performs control so that the charging stop is released when the charging stop release instruction has been acquired via the replacement device communicator 150. The charging stop release instruction is an instruction for releasing the charging stop of the removable battery 510.

When the charging stop release instruction has been acquired, the charging controller 141 controls the charging of the removable battery 510 by controlling the charger 120C in consideration of the measured value of the removable battery 510 output from the measurement sensor 142 with respect to the removable battery 510 accommodated in the slot 120. The charging controller 141 calculates the current charging rate of the removable battery 510 being charged, i.e., the current charging rate of the power storage 511 provided in the removable battery 510, based on the measured value of the removable battery 510 output from the measurement sensor 142. When the charging of the removable battery 510 has been completed, the charging controller 141 outputs information representing that the charging has been completed to the processor 144.

The replacement device communicator 150 acquires the instruction R (the charging stop instruction or the charging stop release instruction) from the operation server 200. The replacement device communicator 150 outputs the charging stop instruction or the charging stop release instruction acquired from the operation server 200 to the replacement device controller 140.

(Configuration of Operation Server 200)

Figure 4:
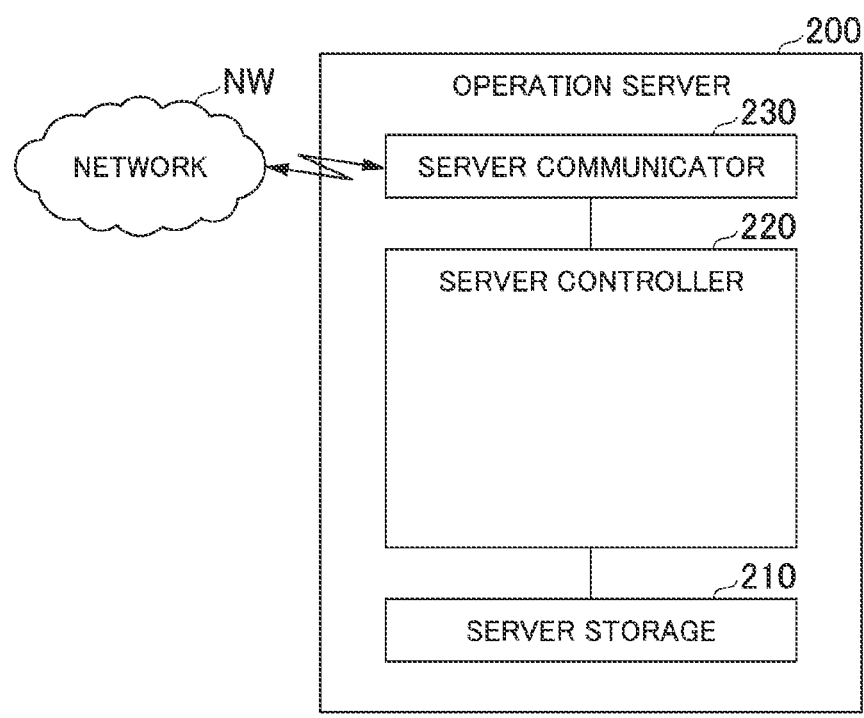
FIG. 4 is a block diagram showing a schematic configuration of an operation server constituting a shared battery management system according to the first embodiment.

Next, an example of a configuration of the operation server 200 will be described. FIG. 4 is a block diagram showing a schematic configuration of the operation server 200 constituting the shared battery management system 10 according to the present embodiment. As shown in FIG. 4, the operation server 200 includes a server storage 210, a server controller 220, and a server communicator 230. The server controller 220 is an example of a "second controller" and the server communicator 230 is an example of a "second communicator."

The server storage 210 stores various information in the operation server 200. The server storage 210 stores a threshold value to be compared with an amount of electric power capable of being supplied (including an amount of electric power [Wh] or an electric power value [W]). The server storage 210 stores a program for the server controller 220 to execute the function of the operation server 200. The server storage 210 may store information of a battery replacement device ID exclusively assigned to the battery replacement device 100.

The server controller 220 controls the entire operation server 200. The server controller 220 is configured to include, for example, a processor such as a CPU. The server controller 220 implements the function of the operation server 200 by reading and executing the program stored in the server storage 210. More specifically, the server controller 220 compares the amount of electric power capable of being supplied included in the suppliable power amount information transmitted by the operation server 200 with the threshold value stored in the server storage 210. When the amount of electric power capable of being supplied is greater than or equal to the threshold value, the server controller 220 outputs the charging stop release instruction to the replacement device communicator 150 so that the charging stop release instruction is transmitted to the battery replacement device 100. When the amount of electric power capable of being supplied is less than the threshold value, the operation server 200 outputs the charging stop instruction to the replacement device communicator 150 so that the charging stop instruction is transmitted to the battery replacement device 100.

The server communicator 230 performs wireless communication with the replacement device communicator 150 provided in the battery replacement device 100 via the network NW. The server communicator 230 receives the suppliable power amount information transmitted by the management server 400 and causes the server storage 210 to store the received suppliable power amount information.

The server communicator 230 transmits the charging stop instruction or the charging stop release instruction output by the processor 144 to the battery replacement device 100 via the network NW.

(Configuration of Management Server 400)

Figure 5:
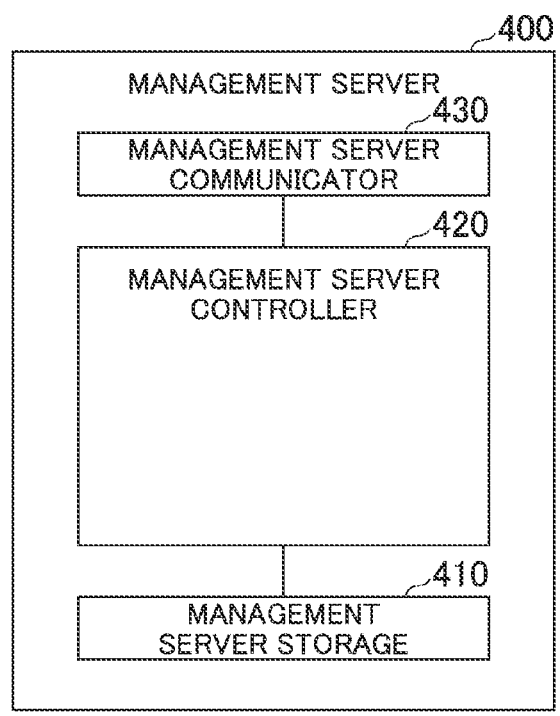
FIG. 5 is a diagram showing an example of a schematic configuration of a management server according to the first embodiment.

Next, an example of a configuration of the management server 400 will be described. FIG. 5 is a block diagram showing a schematic configuration of the management server 400 according to the present embodiment. As shown in FIG. 5, the management server 400 includes a management server storage 410, a management server controller 420, and a management server communicator 430.

The management server storage 410 stores various information in the management server 400. The management server storage 410 stores a mathematical formula, a table, or the like for calculating the amount of electric power capable of being supplied.

The management server controller 420 calculates the amount of electric power capable of being supplied based on the information acquired by the management server communicator 430 from the power generation system 300. For example, a function of sequentially adjusting an angle of a wing of a wind power prime mover to generate power according to demand is provided in wind power generation. The management server controller 420 can calculate a difference between an output at the current wing angle and an output when a wing angle at a maximum output is set with respect to current wind power obtained through an inverse operation from the output and the wing angle as an output margin. The management server controller 420 sets the calculated output margin as the suppliable power amount information and outputs the calculated output margin to the management server communicator 430 so that the calculated output margin is transmitted to the operation server 200 at regular time intervals (for example, every minute).

The management server communicator 430 acquires information from the power generation system 300. The information acquired from the power generation system 300 is information necessary for calculating the amount of electric power capable of being supplied, and is information about, for example, the current wing angle and output, when the power generation system 300 is wind power generation. The management server communicator 430 communicates with the operation server 200. The management server communicator 430 transmits the suppliable power amount information output by the management server controller 420 to the operation server 200.

(Example of Processing Procedure)

Figure 6:
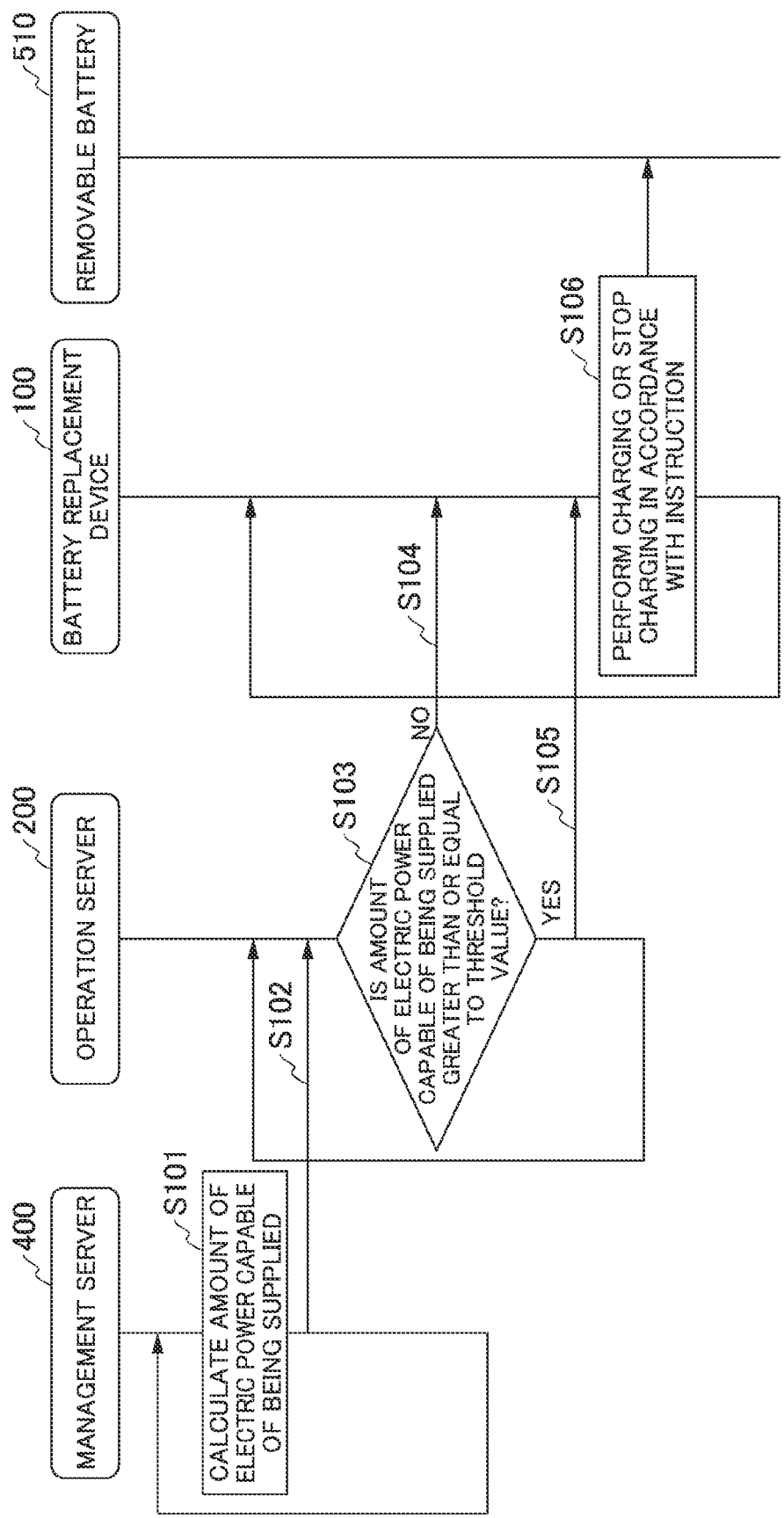
FIG. 6 is a sequence diagram of an example of a processing procedure of the shared battery management system according to the first embodiment.

Next, an example of the processing procedure of the shared battery management system 10 of the present embodiment will be described. FIG. 6 is a sequence diagram of an example of the processing procedure of the shared battery management system 10 according to the present embodiment.

(Step S101) The management server controller 420 of the management server 400 calculates an amount of electric power capable of being supplied to the battery replacement device 100 (an amount of electric power capable of being supplied) based on the information acquired from the power generation system 300. A timing at which the management server controller 420 calculates an amount of electric power capable of being supplied is a predetermined time, when information has been acquired from the power generation system 300 for each predetermined time period, or the like.

(Step S102) The management server controller 420 of the management server 400 transmits the calculated suppliable power amount information to the operation server 200. The management server controller 420 transmits the calculated suppliable power amount information to a group of the operation server 200 included in the shared battery management system 10.

(Step S103) The server controller 220 of the operation server 200 receives the suppliable power amount information transmitted by the management server 400. Subsequently, the server controller 220 determines whether or not the amount of electric power capable of being supplied included in the suppliable power amount information is greater than or equal to the threshold value stored in the server storage 210. When it is determined that the amount of electric power capable of being supplied is greater than or equal to the threshold value (step S103; YES), the server controller 220 performs the processing of step S105. When it is determined that the amount of electric power capable of being supplied is less than the threshold value (step S103; NO), the server controller 220 performs the processing of step S104.

(Step S104) The server controller 220 of the operation server 200 transmits the charging stop instruction (the instruction R) to the battery replacement device 100.

(Step S105) The server controller 220 of the operation server 200 transmits the charging stop release instruction (the instruction R) to the battery replacement device 100.

The server controller 220 performs the processing of steps S103 to S105 when information representing the amount of electric power capable of being supplied has been received from the management server 400.

(Step S106) The replacement device controller 140 of the battery replacement device 100 performs control so that the removable battery 510 is charged in accordance with the instruction R (the charging stop release instruction) received from the operation server 200. Alternatively, the replacement device controller 140 performs control so that the charging of the removable battery 510 is stopped in accordance with the instruction R (the charging stop instruction) received from the operation server 200. The replacement device controller 140 performs the processing of step S106 when the instruction R has been received from the operation server 200.

When charging is performed with electric power from large-scale renewable energy (wind power, mega solar power, or the like) or the like, it is necessary to control charging and stopping according to a power generation situation that varies from moment to moment. Thus, in the present embodiment, the management server 400 and the operation server 200 are connected to each other so that they can communicate with each other and the management server 400 is configured to transmit the power generation situation (the suppliable power amount information) to the operation server 200. In the present embodiment, the operation server 200 and the battery replacement device 100 are connected by a network and the charging stop instruction or the charging stop release instruction generated by the operation server 200 based on the amount of electric power capable of being supplied is transmitted to the battery replacement device 100.

Thereby, in the present embodiment, the management server 400 side can ascertain the power generation situation and the operation server 200 side can control the battery replacement device that permits or stops charging in accordance with the power generation situation received from the management server 400.

Also, according to the present embodiment, it is not necessary to take an individual measure such as rewriting the program for each battery replacement device 100 because the process of the battery replacement device 100 is executed by commands from all the server sides (the management server 400 and the operation server 200) and the operation cost can be reduced because implementation is enabled using the same housing at multiple locations.

Although an example in which the operation server 200 generates the charging stop instruction or the charging stop release instruction in comparison with one threshold value has been described in the above-described example, the present invention is not limited thereto. For example, a threshold value for generating the charging stop instruction and a threshold value for generating the charging stop release instruction may be different.

Alternatively, a plurality of threshold values and the number of slots where charging according to the threshold values is permitted may be set.

FIG. 7 is a diagram showing an example of a plurality of threshold values stored in the server storage 210 according to the present embodiment. In the example shown in FIG. 7, the server storage 210 stores four threshold values (first to fourth threshold values).

The server controller 220 generates the charging stop instruction for all slots 120 when the amount of electric power capable of being supplied is less than the first threshold value. When the amount of electric power capable of being supplied is greater than or equal to the first threshold value and less than the second threshold value, the server controller 220 generates the charging stop release instruction for one slot 120 and generates the charging stop instruction for the seven slots 120. When the amount of electric power capable of being supplied is greater than or equal to the second threshold value and less than the third threshold value, the server controller 220 generates the charging stop release instruction for the four slots 120 and generates the charging stop instruction for the four slots 120.

When the amount of electric power capable of being supplied is greater than or equal to the third threshold value and less than the fourth threshold value, the server controller 220 generates the charging stop release instruction for the six slots 120 and generates the charging stop instruction for the two slots 120. The server controller 220 generates the charging stop release instruction for all eight slots 120 when the amount of electric power capable of being supplied is greater than or equal to the fourth threshold value. In this case, the server controller 220 associates the number of slots with the generated charging stop instruction, associates the number of slots with the generated charging stop release instruction, and transmits association results to the battery replacement device 100. Alternatively, the server controller 220 associates each slot ID with the generated charging stop instruction, associates each slot ID with the generated charging stop release instruction, and transmits association results to the battery replacement device 100. The associated slot IDs are, for example, in the order of IDs. Thereby, it is possible to control the charging stop and the charging stop release precisely.

Although a case in which the operation server 200 transmits an instruction such as the charging stop instruction or the charging stop release instruction to the battery replacement device 100 has been described in the above-described first embodiment, the present invention is not limited thereto. For example, the operation server 200 may transmit a result of determining whether to permit or prohibit charging of the removable battery 510 or a result of determining whether to permit or prohibit rental of the removable battery 510 (detachment of the removable battery 510) to the battery replacement device 100 in place of or in addition to the charging stop instruction or the charging stop release instruction.

Also, although a case in which the operation server 200 determines whether or not to stop the charging of the removable battery 510 or whether or not to prohibit rental and transmits an instruction (the charging stop instruction or the charging stop release instruction) based on a determination result to the battery replacement device 100 has been described in the above-described first embodiment, the present invention is not limited thereto. For example, the battery replacement device 100 may be configured to determine whether or not to stop the charging of the removable battery 510 or whether or not to prohibit rental and control the charging of the removable battery 510 or the rental of the removable battery 510 in accordance with a determination result.

Second Embodiment

In the first embodiment, an example in which the charging stop instruction or the charging stop release instruction for the battery replacement device 100 is transmitted to the battery replacement device 100 based on the amount of electric power generated by the power generation system 300 (including the electric power [Wh] or the electric power value [W]) has been described. In the present embodiment, an example in which charging is stopped in accordance with time to actively support charging using electric power will be described.

A configuration of a shared battery management system 10 is similar to the configuration described with reference to FIGS. 1 to 5. A server controller 220 of an operation server 200 acquires the current time at predetermined intervals, for example, via a network NW. In the shared battery management system 10 of the present embodiment, electric power generated by renewable energy and normal electric power are also supplied to the battery replacement device 100.

A server storage 210 of the operation server 200 stores a corresponding battery replacement device 100 and a charging stop time period. For example, the corresponding battery replacement device 100 may be associated with each region or the like. The charging stop time period is, for example, a time period in which the electricity price is high, a time period in which the power supply is not stable, and the like.

Next, an example of the processing procedure of the shared battery management system 10 of the present embodiment will be described.

Figure 8:
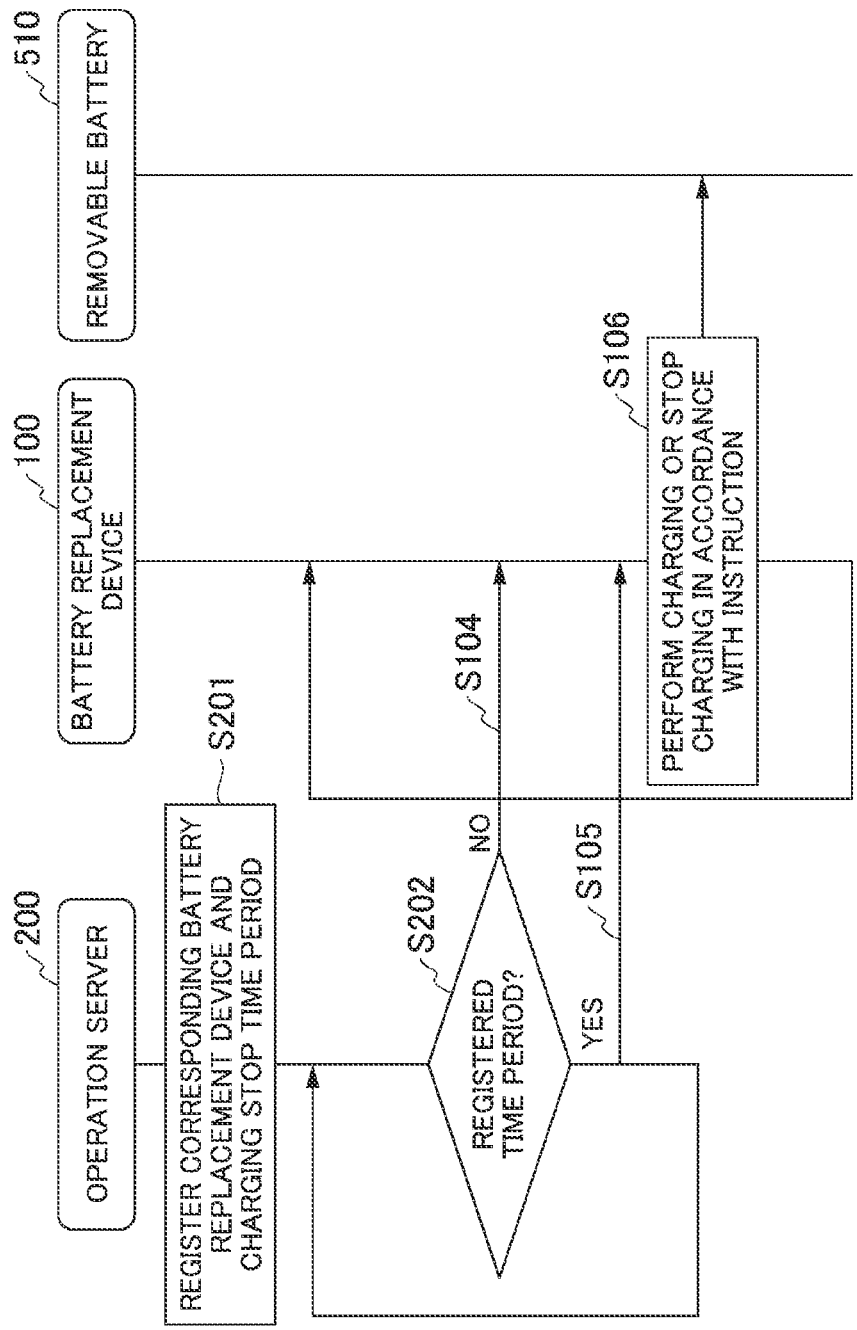
FIG. 8 is a sequence diagram of an example of a processing procedure of a shared battery management system according to a second embodiment.

FIG. 8 is a sequence diagram of an example of a processing procedure of the shared battery management system 10 according to the present embodiment. A process similar to that of FIG. 6 of the first embodiment will be described using the same reference signs.

(Step S201) The server controller 220 of the operation server 200 registers the corresponding battery replacement device 100 and the charging stop time period in the server storage 210.

(Step S202) The server controller 220 of the operation server 200 determines whether or not the current time is in the registered time period. When it is determined that the current time is in the registered time period (step S202; YES), the server controller 220 performs the processing of step S105. When it is determined that the current time is not in the registered time period (step S202; NO), the server controller 220 performs the processing of step S104.

(Step S104) The server controller 220 of the operation server 200 transmits a charging stop instruction (an instruction R) to the battery replacement device 100.

(Step S105) The server controller 220 of the operation server 200 transmits a charging stop release instruction (an instruction R) to the battery replacement device 100.

The server controller 220 performs the processing of steps S202, S104, and S105, for example, every minute.

(Step S106) The replacement device controller 140 of the battery replacement device 100 performs the processing of step S106. The replacement device controller 140 performs the processing of step S106 when the instruction R has been received from the operation server 200.

The server storage 210 may store a time period in which the charging stop is released. The time period in which the charging stop is released, for example, a time period in which the electricity price is low, a time period in which communication is stable, or the like. In this case, the server controller 220 of the operation server 200 may be configured to transmit the charging stop release instruction to the battery replacement device 100 when it is determined that the current time is in the registered time period and transmit the charging stop instruction to the battery replacement device 100 when it determined that the current time is not in the registered time period.

As described above, according to the present embodiment, the charging is stopped or the charging stop is released in a preset time period. As a result, according to the present embodiment, for example, the charging can be stopped in a time period when the electricity price is high and the charging can be performed in a time period when the electricity price is low.

For example, in a case in which charging is actively supported by utilizing late-night electric power or the like, the charging stop instruction can be transmitted to the target battery replacement device 100 by presetting the corresponding battery replacement device 100 and a non-charging time period on the system side (the management server 400 or the operation server 200).

Third Embodiment

Figure 9:
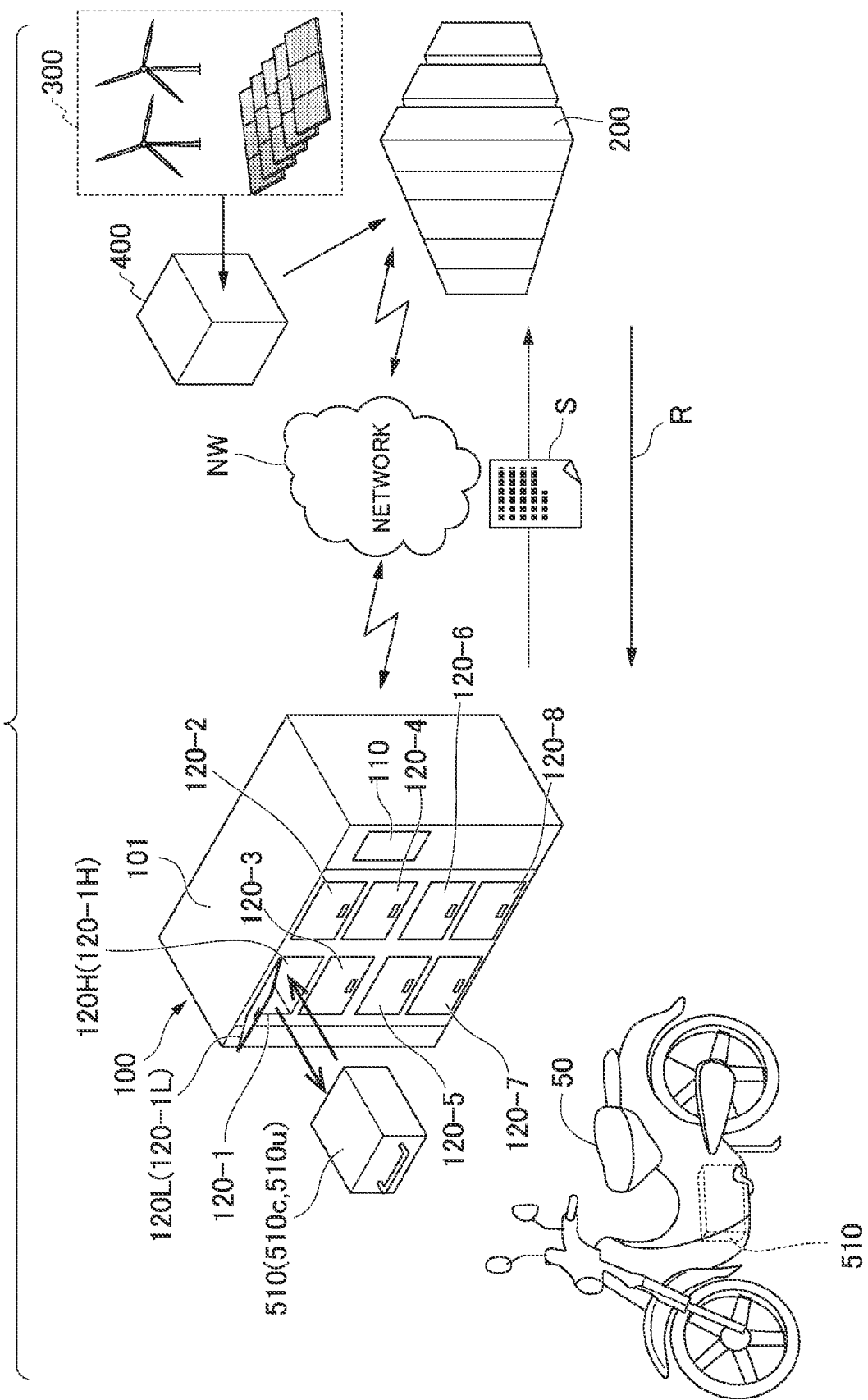
FIG. 9 is a diagram showing a concept of a battery sharing service adopting a shared battery management system according to a third embodiment.

FIG. 9 is a diagram showing a concept of a battery sharing service adopting a shared battery management system according to the present embodiment. As shown in FIG. 9, a shared battery management system 10 is configured to include a removable battery 510, a battery replacement device 100, an operation server 200, a power generation system 300, and a management server 400. The description of the processing and operation similar to those of the first embodiment will be omitted.

In the system shown in FIG. 9, electric power generated by renewable energy and normal electric power are supplied to the battery replacement device 100.

In addition to the process of the first embodiment, the battery replacement device 100 transmits a battery state list S recording information about a stored removable battery 510 to the operation server 200 via a network NW. The battery replacement device 100 receives an instruction R (a charging stop instruction) for each slot 120 transmitted by the operation server 200. When the charging stop instruction for each slot 120 transmitted by the operation server 200 has been received, the battery replacement device 100 performs control so that charging of the removable battery 510 of the target slot 120 is stopped. The battery replacement device 100 receives the instruction R (the charging stop release instruction) for each slot 120 transmitted by the operation server 200. When the charging stop release instruction for each slot 120 transmitted by the operation server 200 has been received, the battery replacement device 100 performs control so that the charging stop of the removable battery 510 of the target slot 120 is released.

The operation server 200 registers a charging determination time in system power and the predetermined minimum number of removable batteries to be charged (hereinafter referred to as the minimum number of removable batteries to be charged) in the server storage 210. When time corresponds to the registered time and the number of removable batteries capable of being charged is less than the minimum number of removable batteries to be charged, the operation server 200 determines the slot 120 where the forced charging stop release is performed and issues a charging stop release instruction for the determined slot 120 to the battery replacement device 100.

When time does not correspond to the registered time or the number of removable batteries capable of being charged is greater than or equal to the minimum number of removable batteries to be charged, the operation server 200 compares an amount of electric power capable of being supplied with a threshold value. When the amount of electric power capable of being supplied is greater than or equal to the threshold value, the operation server 200 transmits a charging stop release instruction to the battery replacement device 100. When the amount of electric power capable of being supplied is less than the threshold value and there is a slot 120 where the forced charging stop release is performed, the operation server 200 selects another slot 120 and transmits a charging stop instruction for the selected slot 120 to the battery replacement device 100.

(Battery State List)

Next, an example of the battery state list S transmitted by the battery replacement device 100 to the operation server 200 will be described. FIG. 10 is a diagram showing an example of the battery state list S transmitted by the battery replacement device 100 to the operation server 200 according to the present embodiment.

As shown in FIG. 10, the battery state list S includes information in which a battery ID is associated with a slot ID for each slot 120 and a battery replacement device ID. Although an example in which the removable batteries 510 are accommodated in all the slots 120 is shown in relation to the battery state list S shown in FIG. 10, information representing that the slot 120 is empty instead of the battery ID is associated with the slot ID when there is a slot 120 where the removable battery 510 is not accommodated. The battery state list S is an example of "corresponding information."

The battery state list may include the number of times the removable battery 510 has been charged, information representing a deterioration state of the removable battery 510, information representing a charging rate of the removable battery 510, information representing that the slot 120 has failed, information representing that the battery replacement device 100 has failed, information representing a creation date and time (or an update date and time) of the battery state list, and the like.

Figure 11:
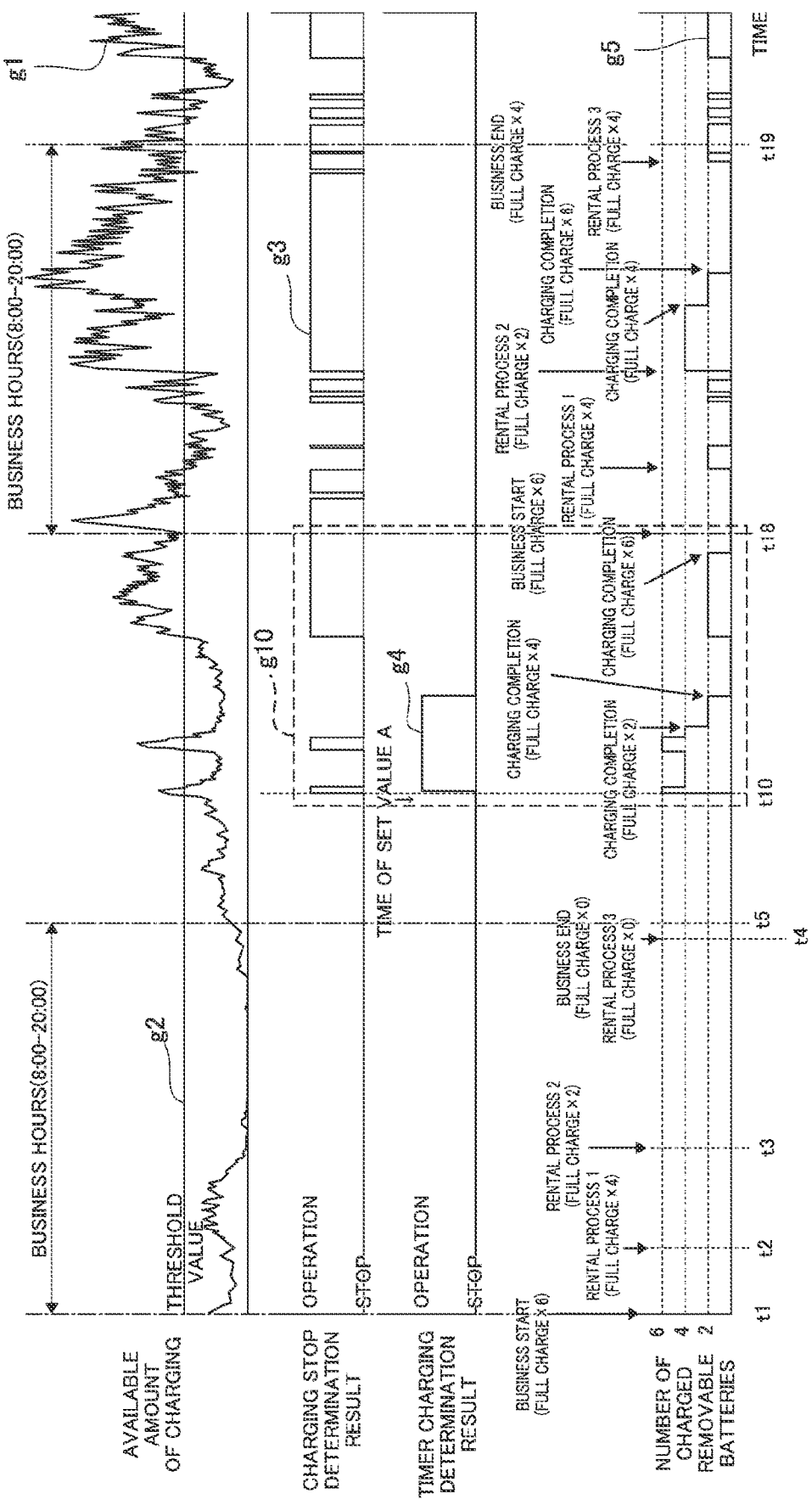
FIG. 11 is a diagram showing an example of an operation of the shared battery management system according to the third embodiment.

Next, an example of an operation of the shared battery management system 10 according to the present embodiment will be described. FIG. 11 is a diagram showing the example of the operation of the shared battery management system 10 according to the present embodiment.

In FIG. 11, the horizontal axis represents time and the vertical axis represents an available amount of charging, a charging stop determination result, a timer charging determination result, and the number of removable batteries to be charged. The example shown in FIG. 11 is an example of an operation of one battery replacement device 100 and business hours of a charging station in which the battery replacement device 100 is installed are from 8:00 to 20:00 (a period from time t1 to time t5 or a period from time t18 to time t19). It is assumed that an electric motorcycle 50 is equipped with two removable batteries 510. Thus, it is assumed that the user returns the two used removable batteries 510 at a time and receives the two charged removable batteries 510 that have been rented out.

Reference sign g1 denotes an amount of electric power capable of being used for charging (an available amount of charging). The available amount of charging is a value obtained by subtracting electric power consumed by the battery replacement device 100 itself from the electric power supplied to the battery replacement device 100. Reference sign g2 denotes a threshold value stored in the server storage 210 of the operation server 200. Reference sign g3 denotes a result of a charging stop determination by the server controller 220. Reference sign g4 denotes a timer charging determination result. The timer charging determination is a determination for stopping charging of a rentable removable battery 510 at the next business start time, for example, at a business end time. Reference sign g5 denotes the number of removable batteries 510 to be charged. Reference sign g10 denotes a period from time t10 to time t18.

As shown by the reference signs g1 and g2 in FIG. 11, the available amount of charging was less than the threshold value during the period from time t1 to time t5, which is the business hours of the first day. Thus, as shown by the reference sign g3, the result of the charging stop determination by the server controller 220 represents charging stop (charging is not performed). As a result, as shown by the reference sign g5, the battery replacement device 100 stops charging, i.e., does not charge the removable battery 510 accommodated in the slot 120.

It is assumed that there are six charged removable batteries 510 at the business start time of time t1. It is assumed that two used removable batteries 510 are returned and two charged removable batteries 510 are rented out at times t2, t3, and t4. Thereby, at time t5 of the business end time, the number of charged removable batteries 510 is zero and the number of used removable batteries 510 is six.

Figure 12:
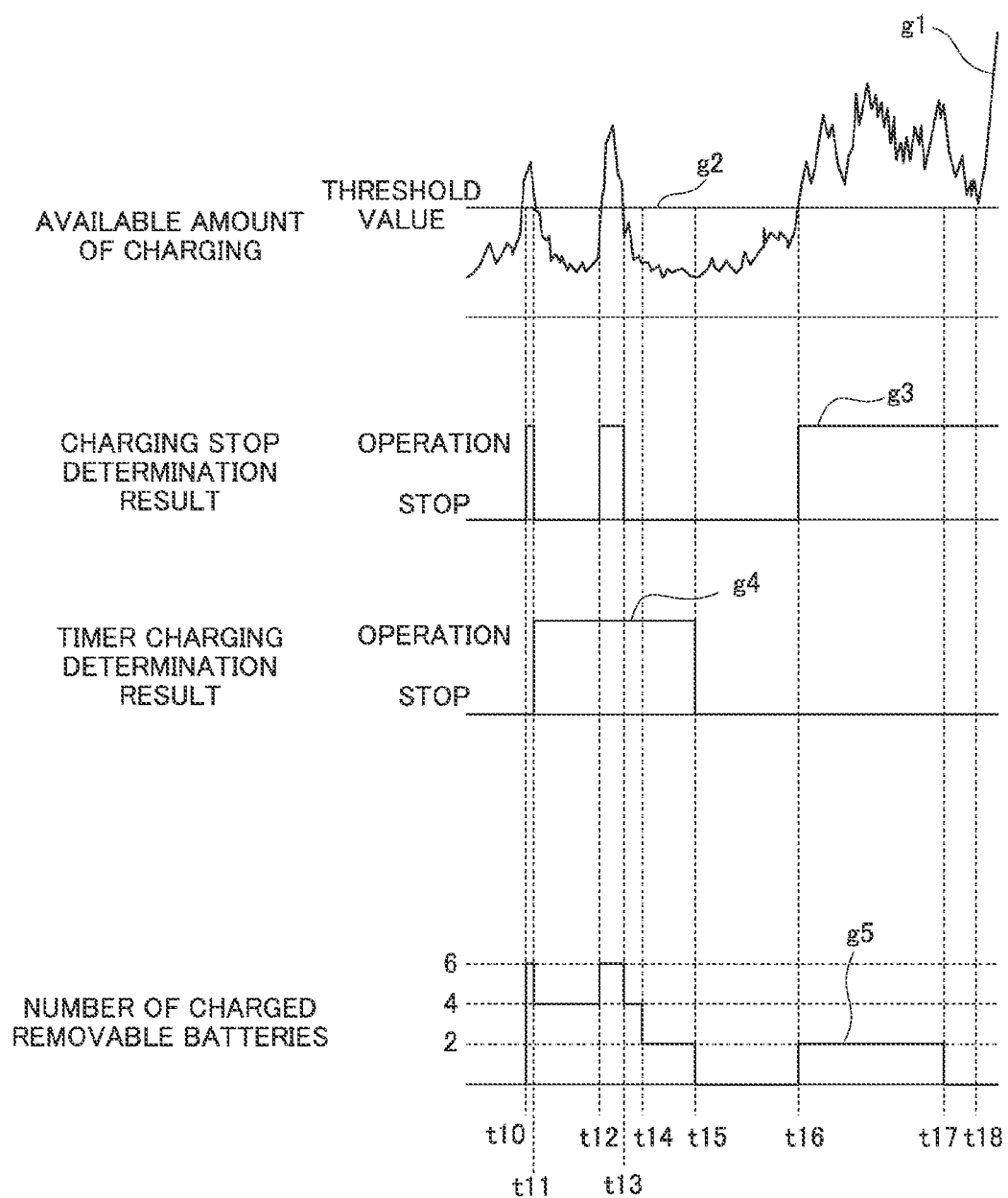
FIG. 12 is an enlarged diagram of a period from time t10 to time t18 in FIG. 11.

The period from time t10 to time t18 shown by the reference sign g10 in FIG. 11 will be described with reference to FIG. 12. FIG. 12 is an enlarged view of the period from time t10 to time t18 in FIG. 11. In FIG. 12, the vertical axis and the horizontal axis are the same as those in FIG. 11 and the reference signs are also the same as those in FIG. 11. As described above, there is a removable battery 510 whose charging is not completed at the business end time.

The available amount of charging exceeds the threshold value during a period from time t10 to time t11. Thereby, the result of the charging stop determination changes from the charging stop to the charging operation. As a result, the operation server 200 transmits the charging stop release instruction to the battery replacement device 100. The battery replacement device 100 charges the six used removable batteries 510 using electric power from renewable energy.

At time t11, the replacement device controller 140 of the battery replacement device 100 performs an operation based on the result of the timer charging determination. It is assumed that the charging determination time is time t10.

During a period from time t11 to time t12, the available amount of charging becomes less than or equal to the threshold value. Thereby, the result of the charging stop determination represents the charging stop. However, because the result of the timer charging determination represents the charging operation, the replacement device controller 140 continues charging using normal electric power for a preset minimum number of removable batteries 510 (four slots which are half of the 8 slots 120 in the examples of FIGS. 11 and 12) during the period from time t11 to time t12.

Because the available amount of charging exceeds the threshold value during a period from time t12 to time t13, the replacement device controller 140 charges the six removable batteries 510 using electric power from renewable energy.

Because, during a period from time t13 to time t14, the available amount of charging is less than or equal to the threshold value, but the result of the timer charging determination represents the charging operation, the replacement device controller 140 continues charging using normal electric power for a minimum number of removable batteries 510 to be charged. At time t14, charging of the two removable batteries is completed. As a result, the remaining number of removable batteries 510 that have not reached full charge becomes four.

Because, during a period from time t14 to time t15, the available amount of charging is less than or equal to the threshold value and the result of the timer charging determination represents the charging operation, the replacement device controller 140 enables two of the remaining four removable batteries 510 to be charged with electric power from renewable energy. Here, the reason why two of the four removable batteries are charged is that the minimum number of removable batteries to be charged is four, two removable batteries have already been charged, and the remaining minimum number of removable batteries to be charged is two. At time t14, charging of the two removable batteries is completed. As a result, the remaining number of removable batteries 510 that have not reached full charge is two.

The available amount of charging exceeds the threshold value during a period from time t16 to time t18. During a period from time t16 to time t17, the replacement device controller 140 charges the six removable batteries 510 using electric power from renewable energy. At time t17, charging of the two removable batteries is completed. As a result, the remaining number of removable batteries 510 that have not reached full charge becomes zero and the charging of six uncharged batteries is completed.

As shown in FIGS. 11 and 12, when the "available amount of charging" falls below the threshold value after the charging determination time (for example, time t10), the replacement device controller 140 performs "timer charging." The replacement device controller 140 performs a charging operation with renewable energy if the "available amount of charging" becomes greater than or equal to the threshold value even during "timer charging."

The replacement device controller 140 continues "timer charging" until a "minimum number of removable batteries are fully charged" according to an implementation condition. Subsequently, the replacement device controller 140 performs a charging operation with renewable energy when the "available amount of charging" becomes greater than or equal to the threshold value. An end time of timer charging from the charging determination time is the time when a minimum number of removable batteries to be charged have been charged.

As shown in FIG. 11, according to the present embodiment, when charging is performed using only renewable energy (wind power generation), a situation in which the available amount of charging is less than or equal to the threshold value during business hours from time t1 to time t5 is also taken into account. When replacement or rental (business) is performed at a fixed time every day as described above, replacement or rental may not be possible due to insufficient charging. Thus, in the present embodiment, electric power from renewable energy and normal electric power are used in combination with an on state and an off state on a time basis.

Figure 13:
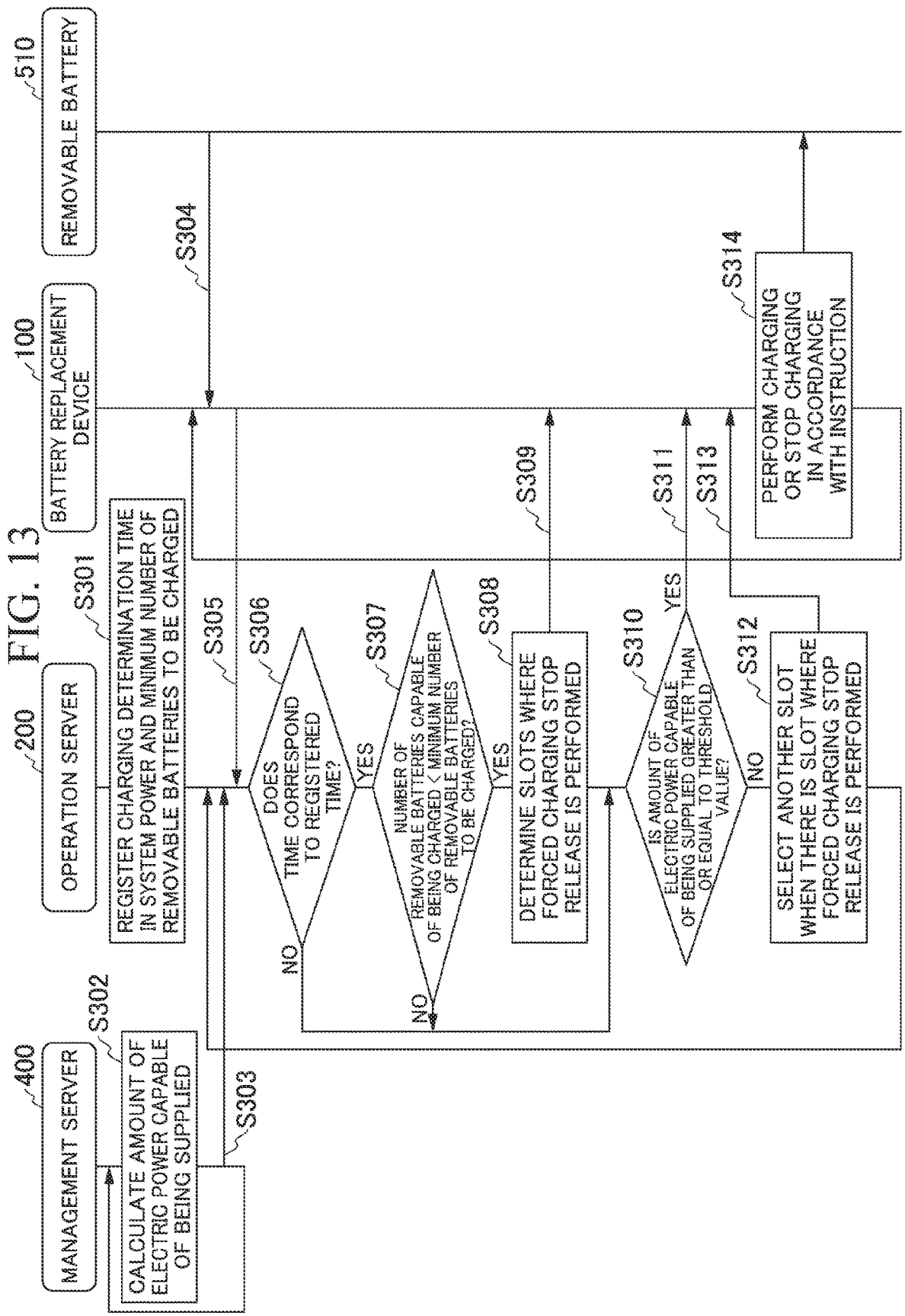
FIG. 13 is a sequence diagram of an example of a processing procedure of the shared battery management system according to the third embodiment.

Next, an example of a processing procedure of the shared battery management system 10 of the present embodiment will be described. FIG. 13 is a sequence diagram of an example of the processing procedure of the shared battery management system 10 according to the present embodiment.

(Step S301) The server controller 220 of the operation server 200 registers a charging determination time in system power and the minimum number of removable batteries to be charged in the server storage 210.

(Step S302) The management server controller 420 of the management server 400 calculates an amount of electric power capable of being supplied based on information acquired from the power generation system 300.

(Step S303) The management server controller 420 of the management server 400 transmits calculated suppliable power amount information to the operation server 200. The management server controller 420 transmits the calculated suppliable power amount information to a group of the operation server 200 included in the shared battery management system 10.

(Step S304) The replacement device controller 140 of the battery replacement device 100 acquires battery state information including a battery ID of the removable battery 510 accommodated in each of the slots 120. Subsequently, the replacement device controller 140 updates a battery state list S based on the acquired battery state information. The replacement device controller 140 creates the battery state list S, for example, at a predetermined time, for a predetermined time period, or at predetermined time interval.

(Step S305) The replacement device controller 140 of the battery replacement device 100 transmits the battery state list S to the operation server 200.

(Step S306) The server controller 220 of the operation server 200 determines whether or not time corresponds to the registered charging determination time. When it is determined that time corresponds to the registered charging determination time (step S306; YES), the server controller 220 proceeds to the processing of step S307. When it is determined that time does not corresponds to the registered charging determination time (step S306; NO), the server controller 220 proceeds to the processing of step S310.

(Step S307) The server controller 220 of the operation server 200 determines whether or not the number of removable batteries capable of being charged is less than the minimum number of removable batteries to be charged. When it is determined that the number of removable batteries capable of being charged is less than the minimum number of removable batteries to be charged (step S307; YES), the server controller 220 proceeds to the processing of step S308. When it is determined that the number of removable batteries capable of being charged is greater than or equal to the minimum number of removable batteries to be charged (step S307; NO), the server controller 220 proceeds to the processing of step S310.

(Step S308) The server controller 220 of the operation server 200 determines slots 120 where the forced charging stop release is performed (minimum number of removable batteries to be charged−current number of charged removable batteries) based on the battery state list S. At this time, although descending or ascending order of the remaining capacities of the accommodated removable batteries 510 can be considered as a criterion for selecting the slot 120 for which the charging stop release instruction is transmitted, it is not particularly specified.

(Step S309) The server controller 220 of the operation server 200 transmits a charging stop release instruction for the determined slots 120 where the forced charging stop release is performed to the battery replacement device 100.

(Step S310) The server controller 220 of the operation server 200 receives suppliable power amount information transmitted by the management server 400. Subsequently, the server controller 220 determines whether or not an amount of electric power capable of being supplied included in the suppliable power amount information is greater than or equal to the threshold value stored in the server storage 210.

When it is determined that the amount of electric power capable of being supplied is greater than or equal to the threshold value (step S310; YES), the server controller 220 performs the processing of step S311. When it is determined that the amount of electric power capable of being supplied is less than the threshold value (step S310; NO), the server controller 220 performs the processing of step S312.

(Step S311) The server controller 220 of the operation server 200 transmits a charging stop instruction (an instruction R) to the battery replacement device 100.

(Step S312) When there is a slot 120 where the forced charging stop release is performed, the server controller 220 of the operation server 200 selects another slot 120.

(Step S313) The server controller 220 of the operation server 200 transmits a charging stop release instruction (an instruction R) to the battery replacement device 100. The server controller 220 performs the processing of steps S306 to S313 at at least one timing between a timing when the information representing the amount of electric power capable of being supplied has been received from the management server 400 and a timing when the battery state list S has been received from the battery replacement device 100.

(Step S314) The replacement device controller 140 of the battery replacement device 100 performs control so that the removable battery 510 is charged in accordance with the instruction R (the charging stop release instruction) received from the operation server 200. Alternatively, the replacement device controller 140 performs control so that charging of the removable battery 510 is stopped in accordance with the instruction R (the charging stop instruction) received from the operation server 200. The replacement device controller 140 performs the processing of step S314 when the instruction R has been received from the operation server 200.

When the timer charging is performed in steps S306 to S309 and steps S302 to S303, a timer charging implementation section is excluded from the target of charging from renewable energy or stopping.

Although an example in which a time period in which timer charging is performed is outside business hours, for example, a night time, has been described in the example described in FIG. 11 and the like, the present invention is not limited thereto. The time period in which timer charging is performed may be within business hours. There may be a plurality of time periods in which timer charging is performed.

As described above, in the present embodiment, the battery state list S created by the battery replacement device 100 based on information acquired from the removable battery 510 is transmitted to the operation server 200.

Also, in the present embodiment, the operation server 200 is configured to register the charging determination time in the system power and the minimum number of removable batteries to be charged. The operation server 200 is configured to control the charging stop or the charging stop release for each slot 120 based on the amount of electric power capable of being supplied received from the management server 400, the battery state list S received from the battery replacement device 100, and the charging determination time in the system power and the minimum number of removable batteries to be charged stored in the operation server 200.

Thereby, according to the present embodiment, it is possible to control the battery replacement device 100 that permits or stops charging and the slot 120 within the battery replacement device 100 according to a power generation situation precisely.

According to the present embodiment, it is not necessary to take an individual measure such as rewriting the program for each battery replacement device 100 because the process is executed by commands from all server sides (the management server 400 and the operation server 200) and the operation cost can be reduced because implementation is enabled using the same housing at multiple locations.

Modified Examples

An example in which the operation server 200 generates a charging stop instruction or a rental prohibition instruction based on the information received from the battery replacement device 100 and the information stored in the operation server 200 has been described in the above-described embodiment.

However, when the battery replacement device 100 has been installed in an area where the communication environment is vulnerable, a state in which communication with the operation server 200 may not be possible may occur.

Thus, in the modified example, an example in which the battery replacement device 100 performs charging stop control even if the communication is unstable as described above will be described.

Figure 14:
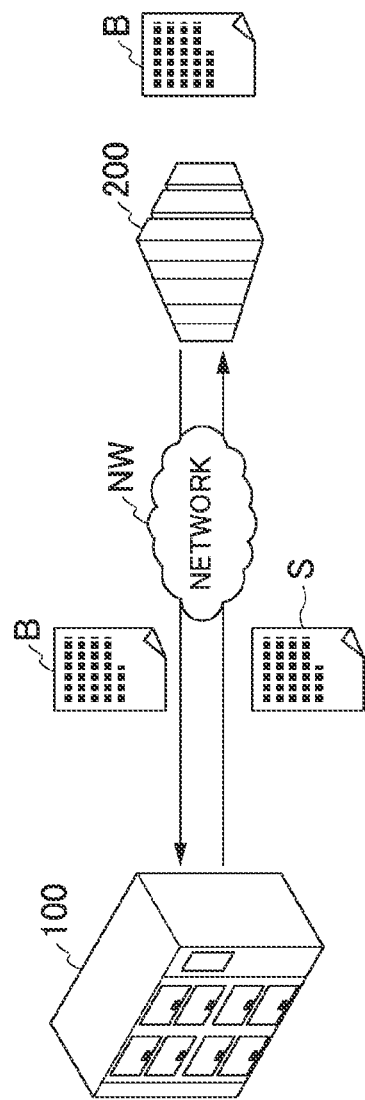
FIG. 14 is a diagram showing a concept of a battery sharing service adopting a shared battery management system according to a modified example of the embodiment.
Figure 15:
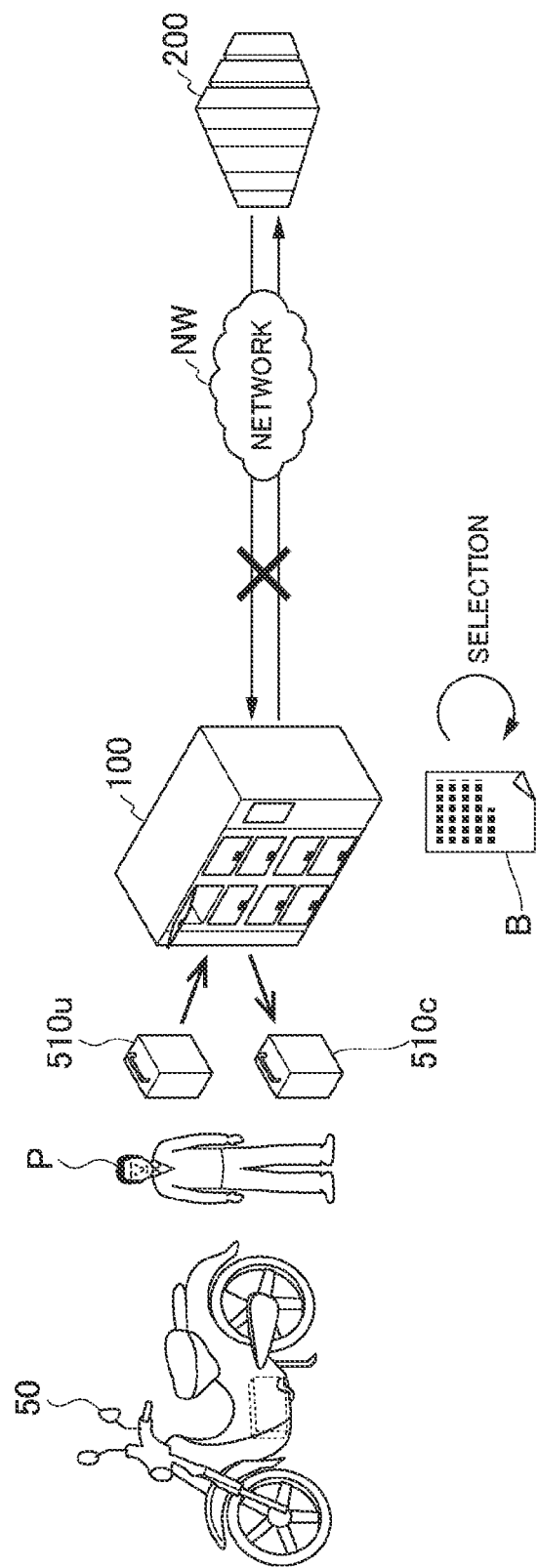
FIG. 15 is a diagram showing a concept of a battery sharing service adopting a shared battery management system according to a modified example of the embodiment.

FIGS. 14 and 15 are diagrams showing a concept of a battery sharing service adopting the shared battery management system according to the modified example of the embodiment. In FIG. 14, a state in which the battery state list S and the upper limit number of slots B are exchanged between the battery replacement device 100 and the operation server 200 via the network NW in the shared battery management system 10 is schematically shown. In FIG. 15, a state in which the battery replacement device 100 replaces the used removable battery 510u brought in by the user P of the electric motorcycle 50 with the charged removable battery 510c based on the acquired upper limit number of slots B is schematically shown.

In the modified example, the operation server 200 creates the upper limit number of slots B, which is information representing the number of slots where charging is possible, and transmits the created upper limit number of slots B to the battery replacement device 100 when communication is possible. The operation server 200 generates the upper limit number of slots B based on, for example, the maximum charging electric current value of the charging characteristics (not shown) of the charged removable battery 510. The battery replacement device 100 stores the received upper limit number of slots B.

When the battery replacement device 100 cannot communicate with the operation server 200 as shown in FIG. 15, the battery replacement device 100 controls the number of slots where charging is performed in accordance with the stored upper limit number of slots B. For example, when the upper limit number of slots is four, for example, the battery replacement device 100 may be configured to select four slots in order from the earliest date and time when the removable battery 510 was returned. When the charging of the removable battery 510 being charged has been completed, the battery replacement device 100 may be configured to start charging of the removable battery 510 of the slot 120 waiting to be charged instead of the slot 120 where the charging has been completed.

As shown in FIG. 15, even if the wireless communication with the operation server 200 via the network NW is interrupted or the wireless communication cannot be stably performed, it is not necessary to immediately stop or interrupt charging of the removable battery 510. The battery replacement device 100 can continuously rent out the charged removable battery 510c and can continuously charge the battery. Thus, in the battery sharing service adopting the shared battery management system 10, when the user P desires to replace the used removable battery 510u, he or she can replace it with the charged removable battery 510c. Generally, the user P uses the battery sharing service at a timing when it is expected that it becomes difficult for the electric motorcycle 50 to travel due to power consumption of the removable battery 510. Thus, the shared battery management system 10 is very effective in maintaining the provision of the battery sharing service in accordance with the rentable battery list B as in the modified example.

Also, all or a part of a process to be performed by the battery replacement device 100, the operation server 200, or the management server 400 may be performed by recording a program for implementing all or some of the functions of the battery replacement device 100, the operation server 200, or the management server 400 according to the present invention on a computer-readable recording medium and causing a computer system to read and execute the program recorded on the recording medium. Also, the "computer system" used here is assumed to include an operating system (OS) and hardware such as peripheral devices. Also, the "computer system" is assumed to include a homepage providing environment (or displaying environment) when a World Wide Web (WWW) system is used. The "computer-readable recording medium" refers to a storage device, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for retaining the program for a given time period as in a volatile memory (a random access memory (RAM)) inside the computer system including a server and a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium including a function of transmitting information, like a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer system, i.e., a so-called differential file (differential program).

The above-described embodiment can be expressed as follows.

(1) According to an aspect of the present invention, there is provided a shared battery management system (10) for managing charging and rental of a removable battery (510) removably mounted on an electric vehicle (the electric motorcycle 50) and shared by a plurality of electric vehicles, the shared battery management system including: the removable battery; a battery replacement device (100) configured to receive electric power supplied from renewable energy, include a slot where the removable battery is accommodated, and control whether or not charging of the removable battery accommodated in the slot is available based on an instruction from an operation server; and the operation server (200) configured to compare an amount of electric power capable of being supplied representing electric power capable of being supplied by the renewable energy to the battery replacement device with a threshold value, transmit a charging stop release instruction for releasing charging stop to the battery replacement device when the amount of electric power capable of being supplied is greater than or equal to the threshold value, and transmit a charging stop instruction for stopping charging to the battery replacement device when the amount of electric power capable of being supplied is less than the threshold value.

According to (1), the battery replacement device switches the charging stop or the charging stop release in accordance with the electric power supplied from the renewable energy using the instruction from the operation server. Thereby, according to (1), it is possible to control the charging of the removable battery accurately as compared with the conventional technology even if the battery replacement device charges the removable battery using the renewable energy.

(2) According to an aspect of the present invention, in the shared battery management system, the number of removable batteries may be two or more, the number of slots may be two or more, the number of threshold values may be two or more, the number of slots according to each of a plurality of threshold values may be set, and the operation server may be configured to compare the amount of electric power capable of being supplied with each of the plurality of threshold values and transmit a charging stop release instruction or a charging stop instruction to the battery replacement device for each of the plurality of slots based on a comparison result.

According to (2), the charging stop or the charging stop release is switched in accordance with electric power supplied from the renewable energy for each slot of the battery replacement device. Thereby, according to (2), it is possible to control the charging stop or the charging stop release for each slot precisely.

(3) According to an aspect of the present invention, in the shared battery management system, the number of removable batteries may be two or more, the number of slots may be two or more, electric power of at least one of thermal power generation, hydroelectric power generation, and nuclear power generation may be supplied to the battery replacement device, when electric power supplied by the renewable energy is less than a threshold value, the operation server may be configured to transmit the charging stop release instruction to the battery replacement device so that a minimum number of removable batteries to be charged which are a number of removable batteries desired to be charged at a minimum are charged, and the battery replacement device may be configured to charge the minimum number of removable batteries to be charged using the electric power of at least one of the thermal power generation, the hydroelectric power generation, and the nuclear power generation in accordance with the charging stop release instruction.

According to (3), it is possible to charge a minimum number of removable batteries to be charged using the electric power of at least one of the thermal power generation, the hydroelectric power generation, and the nuclear power generation when electric power supplied by the renewable energy is less than the threshold value.

(4) According to an aspect of the present invention, in the shared battery management system, the operation server may be configured to transmit the charging stop release instruction to the battery replacement device so that the removable battery is charged when there is a removable battery whose charging is not completed and a predetermined time has been reached.

According to (4), when there is a removable battery whose charging is not completed and a predetermined time has been reached, it is possible to charge a minimum number of removable batteries to be charged using the electric power of at least one of the thermal power generation, the hydroelectric power generation, and the nuclear power generation.

(5) According to an aspect of the present invention, in the shared battery management system, battery identification information for identifying removable batteries may be assigned to a plurality of removable batteries, slot identification information (slot IDs) for identifying slots may be assigned to a plurality of slots, the battery replacement device may be configured to acquire the battery identification information from the removable battery accommodated in the slot, transmit a battery state list in which the battery identification information and the slot identification information are associated for each slot to the operation server, and control whether or not charging is available for each slot based on an instruction from the operation server, and the operation server may be configured to generate each of the charging stop instruction and the charging stop release instruction for each slot based on the battery state list received from the battery replacement device.

According to (5), it is possible to control the charging stop or the charging stop release for each slot precisely based on the battery state list acquired from the battery replacement device.

(6) According to an aspect of the present invention, in the shared battery management system, the battery replacement device may be configured to acquire the battery identification information to update the battery state list when the removable battery has been accommodated in the slot and transmit the updated battery state list to the operation server.

According to (6), because the battery state list is updated and transmitted when the removable battery has been returned, it is possible to control whether or not charging is available or whether or not rental is available with respect to the returned removable battery.

(7) According to an aspect of the present embodiment, in the shared battery management system, the operation server may be configured to create a rentable battery list in which a plurality of removable batteries capable of being charged and rented out in the battery replacement device and an order of rental of the removable batteries are recorded and transmit the created rentable battery list to the battery replacement device and the battery replacement device may be configured to acquire and store the rentable battery list and perform control so that the removable battery is rented out in accordance with the order of the rental represented by the stored rentable battery list even if the instruction is not able to be acquired.

According to (7), even if a state in which communication is disabled between the battery replacement device and the operation server has occurred, the battery replacement device can rent out the removable battery based on the rentable battery list acquired from the operation server.

Although modes for carrying out the present invention have been described above using the embodiments, the present invention is not limited to the embodiments and various modifications and replacements can be applied without departing from the spirit and scope of the present invention.

REFERENCE SIGNS LIST

10 Shared battery management system (battery charging system)
100 Battery replacement device (charging device)
200 Operation server
510, 510c, 510u Removable battery
120, 120-1 to 120-8 Slot (accommodation unit)
110 Display
120T Connector
120C Charger
130 Replacement device storage
140 Replacement device controller (first controller)
150 Replacement device communicator (first communicator)
141 Charging controller
142 Measurement sensor
143 Information acquirer
144 Processor
210 Server storage
220 Server controller (second controller)
230 Server communicator (second communicator)
511 Power storage
512 Measurement sensor
513 BMU
514 Storage
515 Connector
300 Power generation system
400 Management server
410 Management server storage
420 Management server controller
430 Management server communicator
S Battery state list (corresponding information)
R Instruction

What is claimed is:

1. A battery charging system comprising:
a battery configured to supply electric power to an electric power device using electric power;
a charging device configured to charge the battery using renewable power which is electric power generated from renewable energy; and
a server configured to communicate with the charging device,
wherein the charging device comprises
a first communicator configured to communicate with the server; and
a first controller configured to control charging of the battery based on reception information received by the first communicator from the server, and
wherein the server comprises
a second communicator configured to communicate with the charging device; and
a second controller configured to compare receivable power, which is the renewable power capable of being received by the charging device, with a threshold value and transmit transmission information for causing the charging device to control the charging of the battery to the charging device via the second communicator based on a result of comparing the receivable power with the threshold value,
wherein the battery includes a plurality of batteries,
wherein the charging device receives non-renewable power including at least one of electric power generated by thermal power generation and electric power generated by nuclear power generation,
wherein, when the receivable power is less than the threshold value, the second controller is configured to transmit the transmission information for causing the charging device to charge a predetermined number of batteries to be charged at a minimum among the plurality of batteries and to prohibit the charging of more than the predetermined number of batteries to the charging device via the second communicator; and
wherein the first controller is configured to cause the charging of the predetermined number of batteries among the plurality of batteries using the renewable power and prohibit the charging of more than the predetermined number of batteries based on the reception information received by the first communicator from the server.

2. The battery charging system according to claim 1, wherein, when the receivable power is less than another threshold which is smaller than the threshold value, the second controller is configured to transmit the transmission information for prohibiting the charging of the battery to the charging device via the second communicator.

3. The battery charging system according to claim 1, wherein the first controller is configured to cause the charging of more than the predetermined number of batteries using the non-renewable power.

4. The battery charging system according to claim 1, wherein, when there is a battery whose charging is not completed among the plurality of batteries and a predetermined time has been reached, the second controller is configured to transmit the transmission information for causing the charging device to start the charging of the battery to the charging device via the second communicator.

5. A charging device for charging a battery using renewable power which is electric power generated from renewable energy, the battery configured to supply electric power to an electric power device, the charging device comprising:
a controller configured to compare receivable power with a threshold value and control the charging of the battery based on a result of comparing the receivable power with the threshold value, the receivable power being the renewable power which is able to be received by the charging device,
wherein the battery includes a plurality of batteries,
wherein the charging device charges the battery further using non-renewable power including at least one of electric power generated by thermal power generation and electric power generated by nuclear power generation, and wherein, when the receivable power is less than the threshold value, the controller is configured to cause the charging of a predetermined number of batteries to be charged at a minimum among the plurality of batteries using the renewable power and prohibit the charging of more than the predetermined number of batteries.

6. An information processing device comprising:
a communicator configured to communicate with a charging device configured to charge a battery using renewable power which is electric power generated from renewable energy, the battery configured to supply electric power to an electric power device; and
a controller configured to compare receivable power, which is the renewable power capable of being received by the charging device, with a threshold value and transmit transmission information for causing the charging device to control the charging of the battery to the charging device via the communicator based on a result of comparing the receivable power with the threshold value,
wherein the battery includes a plurality of batteries,
wherein the charging device charges the battery further using non-renewable power including at least one of electric power generated by thermal power generation and electric power generated by nuclear power generation, and
wherein, when the receivable power is less than the threshold value, the controller is configured to transmit the transmission information for causing the charging device to charge a predetermined number of batteries to be charged at a minimum among the plurality of batteries and to prohibit the charging of more than the predetermined number of batteries to the charging device via the communicator.

7. A battery charging method comprising:
comparing receivable power, which is renewable power capable of being received by a charging device, with a threshold value, the charging device configured to charge a battery using the renewable power which is electric power generated from renewable energy, the battery configured to supply electric power to an electric power device; and
controlling the charging of the battery based on a result of comparing the receivable power with the threshold value,
wherein the battery includes a plurality of batteries,
wherein the charging device charges the battery further using non-renewable power including at least one of electric power generated by thermal power generation and electric power generated by nuclear power generation, and
wherein the battery charging method further comprising:
when the receivable power is less than the threshold value, charging a predetermined number of batteries to be charged at a minimum among the plurality of batteries using the renewable power and prohibiting the charging of more than the predetermined number of batteries.

8. A computer-readable non-transitory storage medium storing a program for causing a computer to execute:
comparing receivable power, which is renewable power capable of being received by a charging device, with a threshold value, the charging device configured to charge a battery using the renewable power which is electric power generated from renewable energy, the battery configured to supply electric power to an electric power device; and
controlling the charging of the battery based on a result of comparing the receivable power with the threshold value,
wherein the battery includes a plurality of batteries,
wherein the charging device charges the battery further using non-renewable power including at least one of electric power generated by thermal power generation and electric power generated by nuclear power generation, and
wherein the program for causing the computer to further execute:
when the receivable power is less than the threshold value, charging a predetermined number of batteries to be charged at a minimum among the plurality of batteries using the renewable power and prohibiting the charging of more than the predetermined number of batteries.

9. A battery charging system comprising:
a battery configured to supply electric power to an electric power device using electric power;
a charging device configured to charge the battery using renewable power which is electric power generated from renewable energy; and
a server configured to communicate with the charging device,
wherein the charging device comprises:
a first communicator configured to communicate with the server;
an accommodation unit configured to accommodate the battery; and
a first controller configured to control charging of the battery accommodated in the accommodation unit based on reception information received by the first communicator from the server, and
wherein the server comprises:
a second communicator configured to communicate with the charging device; and
a second controller configured to compare receivable power, which is the renewable power capable of being received by the charging device, with a threshold value and transmit transmission information for causing the charging device to control the charging of the battery to the charging device via the second communicator based on a result of comparing the receivable power with the threshold value,
wherein the battery includes a plurality of batteries,
wherein the accommodation unit includes a plurality of accommodation units,
wherein battery identification information, which is identification information for identifying the battery, is assigned to each of a plurality of batteries,
wherein accommodation unit identification information, which is identification information for identifying the accommodation unit, is assigned to each of a plurality of accommodation units,
wherein the charging device further comprises an acquirer configured to acquire the battery identification information from the battery accommodated in the accommodation unit,
wherein the first controller is configured to transmit corresponding information, the corresponding information being information in which the accommodation unit identification information of the accommodation unit where the battery corresponding to the battery identification information acquired by the acquirer is accommodated and the battery identification information acquired by the acquirer are associated with each other, to the server via the first communicator, wherein the first controller is configured to control the charging of the battery for each accommodation unit based on the reception information received by the first communicator from the server, wherein the second controller is configured to generate first transmission information for prohibiting the charging of the battery or second transmission information for permitting the charging of the battery for each accommodation unit based on the corresponding information received by the second communicator from the charging device, and wherein the second controller is configured to transmit the first transmission information or the second transmission information generated for each accommodation unit to the charging device via the second communicator.

10. The battery charging system according to claim 9, wherein, when the battery has been newly accommodated in the accommodation unit where the battery was not accommodated, the acquirer acquires the battery identification information from a new battery which is the battery newly accommodated in the accommodation unit, and wherein the first controller is configured to transmit the corresponding information in which the battery identification information of the new battery acquired by the acquirer and the accommodation unit identification information of the accommodation unit where the new battery has been accommodated are associated with each other to the server via the first communicator.

11. A charging device for charging a battery using renewable power which is electric power generated from renewable energy, the battery configured to supply electric power to an electric power device, the charging device comprising:
an accommodation unit configured to accommodate the battery; and
a controller configured to compare receivable power with a threshold value and control the charging of the battery based on a result of comparing the receivable power with the threshold value, the receivable power being the renewable power which is able to be received by the charging device, wherein the battery includes a plurality of batteries, wherein the accommodation unit includes a plurality of accommodation units, wherein battery identification information, which is identification information for identifying the battery, is assigned to each of a plurality of batteries, wherein accommodation unit identification information, which is identification information for identifying the accommodation unit, is assigned to each of a plurality of accommodation units, wherein the charging device further comprises an acquirer configured to acquire the battery identification information from the battery accommodated in the accommodation unit, wherein the controller is configured to determine to prohibit the charging of the battery or permit the charging of the battery for each accommodation unit based on corresponding information, which is information in which the accommodation unit identification information of the accommodation unit where the battery corresponding to the battery identification information acquired by the acquirer is accommodated and the battery identification information acquired by the acquirer are associated with each other, and wherein the controller is configured to control the charging of the battery based on a determination of prohibiting the charging of the battery or permitting the charging of the battery for each accommodation unit.

12. An information processing device comprising:
a communicator configured to communicate with a charging device including an accommodation unit configured to accommodate a battery, the charging device configured to charge the battery accommodated in the accommodation unit using renewable power which is electric power generated from renewable energy, the battery configured to supply electric power to an electric power device; and
a controller configured to compare receivable power, which is the renewable power capable of being received by the charging device, with a threshold value and transmit transmission information for causing the charging device to control the charging of the battery to the charging device via the communicator based on a result of comparing the receivable power with the threshold value, wherein the battery includes a plurality of batteries, wherein the accommodation unit includes a plurality of accommodation units, wherein battery identification information, which is identification information for identifying the battery, is assigned to each of a plurality of batteries, wherein accommodation unit identification information, which is identification information for identifying the accommodation unit, is assigned to each of a plurality of accommodation units, wherein the controller is configured to generate first transmission information for prohibiting the charging of the battery or second transmission information for permitting the charging of the battery for each accommodation unit based on a corresponding information, the corresponding information being information in which the accommodation unit identification information of the accommodation unit where the battery is accommodated and the battery identification information are associated with each other, wherein the controller is configured to transmit the first transmission information or the second transmission information generated for each accommodation unit to the charging device via the communicator.

13. A battery charging method comprising:
comparing receivable power, which is renewable power capable of being received by a charging device, with a threshold value, the charging device including an accommodation unit configured to accommodate a battery and configured to charge the battery accommodated in the accommodation unit using the renewable power which is electric power generated from renewable energy, the battery configured to supply electric power to an electric power device; and
controlling the charging of the battery based on a result of comparing the receivable power with the threshold value, wherein the battery includes a plurality of batteries, wherein the accommodation unit includes a plurality of accommodation units, wherein battery identification information, which is identification information for identifying the battery, is assigned to each of a plurality of batteries, wherein accommodation unit identification information, which is identification information for identifying the accommodation unit, is assigned to each of a plurality of accommodation units, wherein the battery charging method further comprising:

acquiring the battery identification information from the battery accommodated in the accommodation unit, determining to prohibit the charging of the battery or permit the charging of the battery for each accommodation unit based on corresponding information, the corresponding information being information in which the accommodation unit identification information of the accommodation unit where the battery corresponding to the acquired battery identification information is accommodated and the acquired battery identification information are associated with each other, and controlling the charging of the battery based on a determination of prohibiting the charging of the battery or permitting the charging of the battery for each accommodation unit.

14. A computer-readable non-transitory storage medium storing a program for causing a computer to execute:

comparing receivable power, which is renewable power capable of being received by a charging device, with a threshold value, the charging device including an accommodation unit configured to accommodate a battery and configured to charge the battery accommodated in the accommodation unit using the renewable power which is electric power generated from renewable energy, the battery configured to supply electric power to an electric power device; and controlling the charging of the battery based on a result of comparing the receivable power with the threshold value, wherein the battery includes a plurality of batteries, wherein the accommodation unit includes a plurality of accommodation units, wherein battery identification information, which is identification information for identifying the battery, is assigned to each of a plurality of batteries, wherein accommodation unit identification information, which is identification information for identifying the accommodation unit, is assigned to each of a plurality of accommodation units, wherein the program for causing the computer to further execute:

acquiring the battery identification information from the battery accommodated in the accommodation unit, determining to prohibit the charging of the battery or permit the charging of the battery for each accommodation unit based on corresponding information, the corresponding information being information in which the accommodation unit identification information of the accommodation unit where the battery corresponding to the acquired battery identification information is accommodated and the acquired battery identification information are associated with each other, and controlling the charging of the battery based on a determination of prohibiting the charging of the battery or permitting the charging of the battery for each accommodation unit.

* * * * *